(12) United States Patent
Bansal et al.

(10) Patent No.: US 10,586,185 B2
(45) Date of Patent: *Mar. 10, 2020

(54) MACHINE LEARNING ARTIFICIAL INTELLIGENCE SYSTEM FOR PREDICTING POPULAR HOURS

(71) Applicant: Capital One Services, LLC, McLean, VA (US)

(72) Inventors: Ashish Bansal, San Ramon, CA (US); Jonathan Mark Stahlman, San Francisco, CA (US); Kai-Ting Neo, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,119

(22) Filed: Apr. 20, 2018

(65) Prior Publication Data
US 2018/0308023 A1      Oct. 25, 2018

Related U.S. Application Data

(60) Provisional application No. 62/487,529, filed on Apr. 20, 2017.

(51) Int. Cl.
*G06Q 10/06*      (2012.01)
*G06N 20/00*      (2019.01)
(Continued)

(52) U.S. Cl.
CPC ........... *G06Q 10/063* (2013.01); *G06F 15/76* (2013.01); *G06N 3/02* (2013.01); *G06N 5/003* (2013.01);
(Continued)

(58) Field of Classification Search
CPC ...... G06Q 10/0633; G06F 15/18; G06N 3/02; G06N 5/046
See application file for complete search history.

(56) References Cited

U.S. PATENT DOCUMENTS 6,110,214 A * 8/2000 Klimasauskas ...... G05B 13/027
700/30
7,222,082 B1 * 5/2007 Adhikari ................ G06Q 10/06
705/7.22

(Continued)

OTHER PUBLICATIONS

Guidoum, Arsalane Chouaib. "Kernel Estimate and Bandwidth Selection for Density and its Derivatives" 2015 [Online] Downloaded Aug. 30, 2018 https://cran.r-project.org/web/packages/kedd/vignettes/kedd.pdf.*

(Continued)

*Primary Examiner* — Ben M Rifkin
(74) *Attorney, Agent, or Firm* — Finnegan, Henderson, Farabow, Garrett & Dunner, LLP

(57) ABSTRACT

A system for generating a graphical user interface in a client device. The system may include a processor in communication with the client device and a database. The processor may execute: receiving a request for occupancy information of a specified merchant; obtaining a plurality of credit card authorizations associated with the merchant; generating a posted transaction array based on the credit card authorizations; removing outlier members of the posted transaction array by applying a threshold filter; generating a transaction frequency array based on the posted transaction array, the transaction frequency array comprising weekdays and aggregated transactions associated with the weekdays; modifying the transaction frequency array by applying a transformation to the aggregated transactions; generating a smoothed array by applying a kernel density estimate to the (Continued)

transaction frequency array; and generating a graphical user interface displaying information in the smoothed array.

19 Claims, 20 Drawing Sheets

(51) Int. Cl.

| | | |
|---|---|---|
| G06F 15/76 | (2006.01) | |
| G06N 5/02 | (2006.01) | |
| G06N 20/20 | (2019.01) | |
| G06N 5/00 | (2006.01) | |
| G06N 7/00 | (2006.01) | |
| G06N 3/02 | (2006.01) | |
| G06N 5/04 | (2006.01) | |
| G06N 20/10 | (2019.01) | |
| G06N 3/04 | (2006.01) | |
| G06Q 40/00 | (2012.01) | |

(52) U.S. Cl.
CPC ............ *G06N 5/025* (2013.01); *G06N 5/046* (2013.01); *G06N 7/005* (2013.01); *G06N 20/00* (2019.01); *G06N 20/20* (2019.01); *G06Q 10/0633* (2013.01); *G06N 3/0445* (2013.01); *G06N 3/0454* (2013.01); *G06N 20/10* (2019.01); *G06Q 40/12* (2013.12)

(56) References Cited

U.S. PATENT DOCUMENTS

| | | | |
|---|---|---|---|
| 8,135,624 B1 | 3/2012 | Ramalingam et al. | |
| 8,812,351 B2 | 8/2014 | Zollino et al. | |
| 9,875,451 B2 | 1/2018 | Bostick et al. | |
| 2002/0133569 A1* | 9/2002 | Huang | G06Q 40/04 709/219 |
| 2003/0208468 A1* | 11/2003 | McNab | G06Q 10/10 |
| 2010/0211308 A1 | 8/2010 | Zheng et al. | |
| 2015/0076230 A1* | 3/2015 | Woolf | G06K 7/0013 235/438 |
| 2015/0172864 A1 | 6/2015 | Fabrikant et al. | |
| 2015/0178355 A1 | 6/2015 | Christy | |
| 2016/0125337 A1 | 5/2016 | von Walstrom et al. | |
| 2017/0150318 A1* | 5/2017 | Mappus | H04W 4/025 |
| 2017/0177723 A1* | 6/2017 | Price | H04W 4/04 |

OTHER PUBLICATIONS

Yang, Hui. "Data Preprocessing" 2012 [Online] Downloaded Aug. 30, 2018 http://citeseerx.ist.psu.edu/viewdoc/download?doi= 10.1.1.467.29&rep=rep1&type=pdf.*

Xie, Yaya et al "Customer churn prediction using improved blaanced random forests" Apr. 2009 [Online] Downloaded Aug. 30, 2018 https://www.sciencedirect.com/science/article/pii/S0957417408004326.*

Humboldt University "6.1 Kernel Density Estimation" Verified by waybakc machine to 2014 [Online] Downloaded Apr. 17, 2019 https://web.archive.org/web/20141021082719/http://sfb649.wiwi.hu-berlin.de/fedc_homepage/xplore/tutorials/xlghtmlnode33.html (Year: 2014).*

MYCPlus "Arrays as Data structure in C/C++ Programming" Verified by wayback machine to 2009 [Online] Downloaded Apr. 17, 2019 https://web.archive.org/web/20090330200143/https://www.mycplus.com/tutorials/data-structures/arrays-c-cpp-programming/ (Year: 2009).*

* cited by examiner

| Time interval | Start | 0:00 | 0:30 | 1:00 | 1:30 | 2:00 | 2:30 | 3:00 | ... | 9:00 | 9:30 | 10:00 | 10:30 | 11:00 | 11:30 | 12:00 |
|---|---|---|---|---|---|---|---|---|---|---|---|---|---|---|---|---|
| | End | 0:30 | 1:00 | 1:30 | 2:00 | 2:30 | 3:00 | 3:30 | ... | 9:30 | 10:00 | 10:30 | 11:00 | 11:30 | 12:00 | 12:30 |
| Aggregate # of credit card authorizations | | 0 | 0 | 0 | 0 | 0 | 0 | 0 | ... | 170 | 854 | 997 | 506 | 652 | 110 | 1 |

1012 — Time interval
1014 — Aggregate # of credit card authorizations

| Time interval | Start | 0:00 | 0:30 | 1:00 | 1:30 | 2:00 | 2:30 | 3:00 | ... | 9:00 | 9:30 | 10:00 | 10:30 | 11:00 | 11:30 | 12:00 |
|---|---|---|---|---|---|---|---|---|---|---|---|---|---|---|---|---|
| | End | 0:30 | 1:00 | 1:30 | 2:00 | 2:30 | 3:00 | 3:30 | ... | 9:30 | 10:00 | 10:30 | 11:00 | 11:30 | 12:00 | 12:30 |
| Prediction indication | open/closed | Closed | Closed | Closed | Closed | Closed | Closed | Closed | ... | Open | Open | Open | Open | Open | Open | Closed |
| Probability values | % | 1 | 3 | 4 | 2 | 3 | 4 | 1 | ... | 93 | 92 | 91 | 95 | 94 | 99 | 4 |

1022 — Time interval
1024 — Prediction indication
1026 — Probability values

MACHINE LEARNING ARTIFICIAL INTELLIGENCE SYSTEM FOR PREDICTING POPULAR HOURS

PRIORITY CLAIM

This application claims priority from U.S. Provisional Application No. 62/487,529, filed Apr. 20, 2017, which is hereby incorporated by reference in the present application.

TECHNICAL FIELD

The present disclosure relates generally to a machine learning artificial intelligence system for modeling hours of operation and popular hours, and more particularly, to an artificial intelligence system to model a merchant's hours of operation and popular hours of service using credit card authorization data and machine learning.

BACKGROUND

Consumers often prefer to know whether and when business establishments are open for business, to allow them to organize and plan their own schedules. In addition, consumers prefer to know how busy a merchant is at a given time, to avoid lines and more efficiently access services. There is no central repository, however, as to when all businesses are open or when the business is busy.

When a credit card is used to pay for a product, the merchant submits a request to an acquirer bank. The acquirer bank then sends a request to an issuer bank that authorizes or declines the transaction. If the transaction is approved, the issuer bank provides an authorization code to the acquirer bank, which notifies the merchant to complete the transaction. Each request and authorization involved in this process includes data about the merchant, the consumer, and the transaction. For example, credit card authorizations may have time stamps, a merchant identifier, a transaction amount, and an account number, among other things. Therefore, credit card authorizations may be used to make inferences about the merchant, the consumer, or the transaction. Particularly nowadays, when millions of credit card transactions are recorded every day, statistical methods can be used to analyze credit card authorization data, make accurate inferences, and observe trends.

Credit card authorizations are normally generated when a merchant is open for operation and serving customers. Typically, merchants submit the credit card authorization requests to the acquirer bank concurrently with a consumer making a purchase. Therefore, credit card authorizations can be used to infer whether the merchant is serving customers and is thus "open." For example, a restaurant may normally issue multiple credit card authorization requests between 11 am and 1 pm when it serves customers during lunch. Thus, it is possible to infer that the restaurant is open between 11 am and 1 pm, based on credit card authorization requests. On the other hand, the same restaurant may not issue any credit card authorization requests between 1 am and 2 am. Thus, it is possible to infer that the restaurant is "closed" between 1 am and 2 am. Therefore, analysis of credit card authorization data can be used to predict a merchant's hours of operation.

Moreover, the credit card authorization data can also be used to make prediction on how busy a merchant is. For example, if a merchant issues multiple credit card authorizations within an hour, it is possible to infer that the merchant is busy during that hour as many customers are paying services or goods. Alternatively, if a merchant is only issuing a few credit card authorizations, is possible to infer that the merchant is not busy because there is likely not many costumers at that time.

However, making accurate predictions of merchant's hours of operation and merchant's popular hours based on credit card authorization request data alone may be challenging for several reasons. First, there may be an imperfect correlation between credit card authorization data and hours of operation. For example, a restaurant may open at 10 am but only start issuing credit card authorizations at 10:30 am, when the first customer finishes his or her meal and pays. Similarly, customers may pay for their meals in a restaurant as they leave, so the merchant may be busy before the credit card authorization is issued. In these examples, the correlations between hours of operation and authorization requests and between merchant's popular hours and authorization requests are offset and may lead to prediction errors. Second, data repositories of credit card authorizations may store millions of authorizations per day. The large quantity and variety of authorization formats and merchant practices may make it difficult to effectively process the authorization data. Third, the correlations between credit card authorizations and hours of operation or popular hours can be dynamic and may be influenced by externalities. For example, the correlation between authorizations and hours of operation or popular hours may be influenced by merchant location, season, and/or business type. For instance, a merchant may have summer hours of operation that are different to the winter hours of operation. Similarly, a merchant's popular hours may peak during the end of the year holidays. These are some of the difficulties that make prediction of hours of operation challenging, but other variables also affect correlations and predictions.

Moreover, predicting popular or busy hours present additional challenges. For example, different merchants types may have different average service times. For example, fast food restaurants serve clients faster than sit down restaurants. Thus, the same pattern of credit card authorizations does not accurately represent the popular or busy hours for different merchants. Also, because a single customer may pay for many customers, the number of credit card authorizations may not represent how busy is the merchant. Also, some credit card authorizations may be generated without a user being in a merchant. For instance, credit card authorizations of online purchases for take home food in restaurants affect the correlation between credit card authorization use and busy hours in a merchant. These are additional difficulties that make prediction of a merchant's popular hours challenging.

The disclosed machine learning artificial intelligence system and modeling methods address one or more of the problems set forth above and/or other problems in the prior art.

SUMMARY

One aspect of the present disclosure is directed to an artificial intelligence system for communicating predicted hours of operation to a client device. The system may include a processor in communication with a client device and a database; and a storage medium storing instructions. When executed, the instructions in the storage medium configure the processor to: receive, from the client device, a request for hours of operation of a merchant, the request specifying a day of the week; obtain, from the database in response to the request, a set of credit card authorizations associated with the merchant; determine a selected day authorizations subset by selecting, from the set of credit card authorizations, credit card authorizations issued on the specified day of the week; generate a posted transaction array based on the selected day authorizations subset, the posted transaction array may include a plurality of time intervals and numbers of transactions for the time intervals; generate a predictions list based on the posted transaction array, the predictions list including the time intervals and prediction indications for the time intervals; and communicate the predictions list to the client device.

Another aspect of the present disclosure is directed a non-transitory computer-readable medium storing instructions that, when executed by a processor, cause the processor to operate an artificial intelligence system for communicating predicted hours of operation to a client device. The instructions may include receiving, from a client device, a request for hours of operation of a merchant, the request specifying a day of the week; obtaining, from a database in response to the request, a set of credit card authorizations associated with the merchant; determining a selected day authorizations subset by selecting, from the set of credit card authorizations, credit card authorizations issued on the specified day of the week; generating a posted transaction array based on the selected day authorizations subset, the posted transaction array including a plurality of time intervals and numbers of transactions for the time intervals; generating a predictions list based on the posted transaction array, the predictions list including the time intervals and prediction indications for the time intervals; and communicating the predictions list to the client device.

Yet another aspect of the present disclosure is directed to an artificial intelligence method for communicating hours of operation to a client device, the method including: receiving, from a client device, a request for hours of operation of a merchant, the request specifying a day of the week; obtaining, from a database in response to the request, a set of credit card authorizations associated with the merchant; determining a selected day authorizations subset by selecting, from the set of credit card authorizations, credit card authorizations issued on the specified the day of the week; generating a posted transaction array based on the selected day authorizations subset, the posted transaction array including a plurality of time intervals and numbers of transactions for the time intervals; generating a predictions list based on the posted transaction array, the predictions list including the time intervals and prediction indications for the time intervals; and communicating the predictions list to the client device.

Yet another aspect of the present disclosure is directed to a system for generating a graphical user interface in a client device. The system may include at least one processor in communication with the client device and a database; and a storage medium storing instructions. The instructions may configure the at least one processor to execute operations including: receiving, from the client device, a request for occupancy information of a specified merchant; obtaining, from the database in response to the request, a plurality of credit card authorizations associated with the merchant; generating a posted transaction array based on the credit card authorizations, the posted transaction array comprising a plurality of time intervals and numbers of transactions for the time intervals; removing outlier members of the posted transaction array by applying a threshold filter; generating a transaction frequency array based on the posted transaction array, the transaction frequency array comprising weekdays and aggregated transactions associated with the weekdays; modifying the transaction frequency array by applying a linear transformation to the aggregated transactions; generating a smoothed array by applying a kernel density estimate to the transaction frequency array; and generating a graphical user interface displaying information in the smoothed array.

Other aspect of the present disclosure is directed to a non-transitory computer-readable medium storing instructions that, when executed by a processor, cause the processor to operate system for generating a graphical user interface in a client device. The instructions may include: receiving, from the client device, a request for occupancy information of a specified merchant; obtaining, from the database in response to the request, a plurality of credit card authorizations associated with the merchant; generating a posted transaction array based on the credit card authorizations, the posted transaction array comprising a plurality of time intervals and numbers of transactions for the time intervals; removing outlier members of the posted transaction array by applying a threshold filter; generating a transaction frequency array based on the posted transaction array, the transaction frequency array comprising week days and aggregated transactions associated with the week days; modifying the transaction frequency array by applying a linear transformation to the aggregated transactions; generating a smoothed array by applying a kernel density estimate to the transaction frequency array; and generating a graphical user interface displaying information of the smoothed array.

Yet other aspect of the present disclosure is directed to a computer implemented method for generating a graphical user interface in a client device. The method may include: receiving, from the client device, a request for occupancy information of a specified merchant; obtaining, from the database in response to the request, a plurality of credit card authorizations associated with the merchant; generating a posted transaction array based on the credit card authorizations, the posted transaction array comprising a plurality of time intervals and numbers of transactions for the time intervals; removing outlier members of the posted transaction array by applying a threshold filter; generating a transaction frequency array based on the posted transaction array, the transaction frequency array comprising weekdays and aggregated transactions associated with the weekdays; modifying the transaction frequency array by applying a linear transformation to the aggregated transactions; generating a smoothed array by applying a kernel density estimate to the transaction frequency array; and generating a graphical user interface displaying information of the smoothed array.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 10A is an exemplary posted transaction array, consistent with disclosed embodiments.

FIG. 10B is an exemplary prediction list, consistent with disclosed embodiments.

DETAILED DESCRIPTION

The disclosure is generally directed to a machine learning artificial intelligence system for predicting hours of operation or popular hours of a merchant and communicating them to a client device. The artificial intelligence system may model a merchant's hours of operation and popular hours using credit card authorization data. In some embodiments, a client device may present to a prediction system a request for a merchant's hours of operation and/or the merchant's popular hours. The prediction system may analyze credit card authorization data associated with the merchant using prediction models. The prediction models may be generated using machine learning algorithms that study training data sets that associate merchants with corresponding "ground truth," that is, information provided by direct observation as opposed to information provided by inference. In addition, the prediction models may modify the data to prevent biasing errors and remove outliers. The machine learning algorithms may update and tailor the prediction models based on the client request. The prediction system may output a prediction of hours of operation and/or popular hours based on the analysis of credit card authorizations. In some embodiments, the prediction system may be coupled with databases that store credit card authorizations and use data processing methods to curate information and facilitate data analysis. In other embodiments, the prediction system may improve accuracy by using iterative methods in which multiple prediction models are generated and then aggregated. In yet other embodiments, the prediction system may be hardware configured to efficiently conduct filtering, sorting, and parallel calculation tasks to improve computing time and cost.

Reference will now be made in detail to the disclosed embodiments, examples of which are illustrated in the accompanying drawings.

Figure 1:
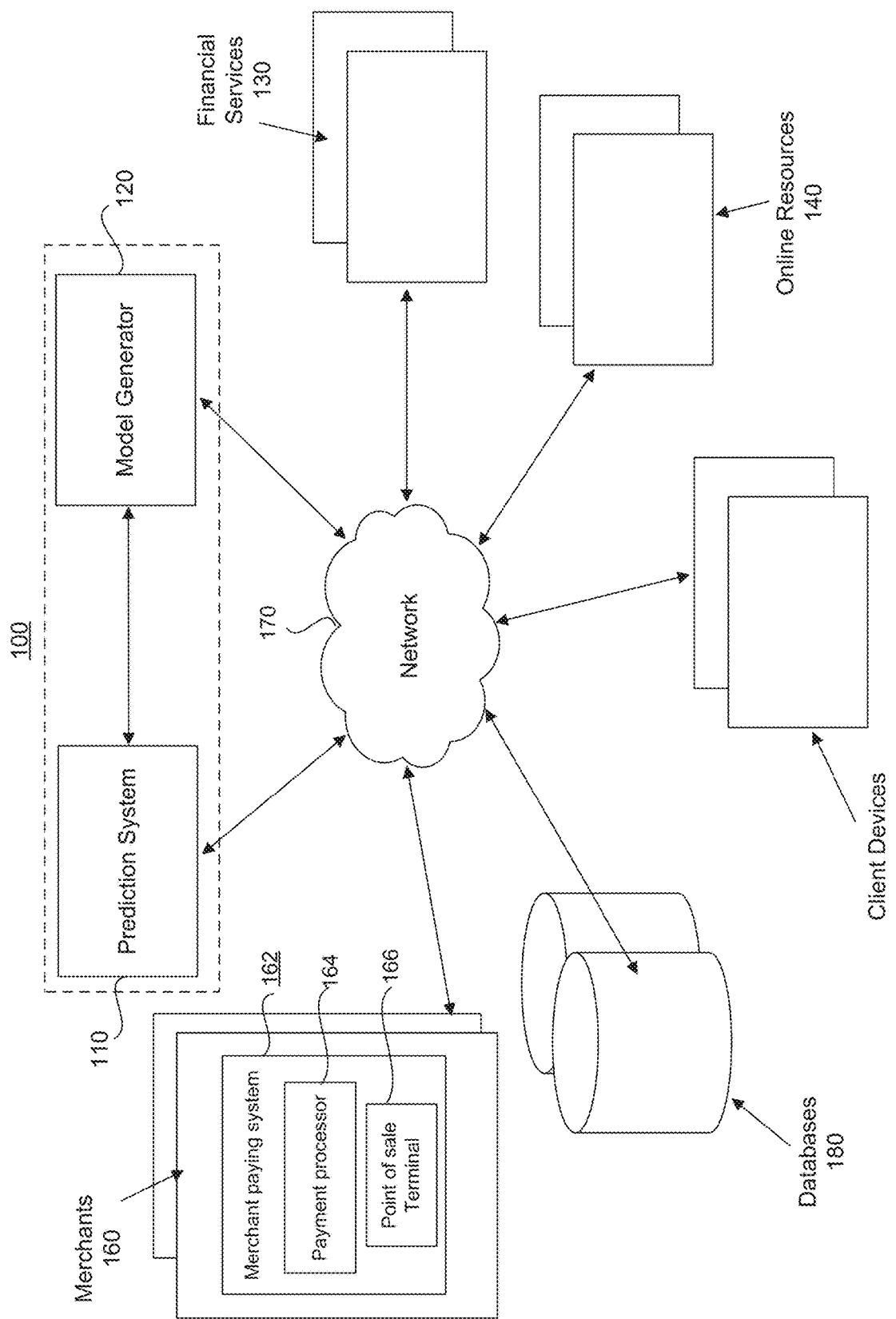
FIG. 1 is a block diagram of an exemplary system, consistent with disclosed embodiments.

FIG. 1 is a block diagram of an exemplary system 100, consistent with disclosed embodiments. System 100 may be used to predict a merchant's hours of operation or a merchant's busy or popular hours, consistent with disclosed embodiments. System 100 may include a prediction system 110, a model generator 120, financial services system 130, online resources 140, client devices 150, merchant systems 160, and databases 180. In some embodiments, as shown in FIG. 1, each component of system 100 may be connected to a network 170. However, in other embodiments components of system 100 may be connected directly with each other, without network 170.

Financial services system 130 may be a system associated with a financial service provider, which may be an entity providing financial services. For example, financial services system 130 may be associated with a bank, a credit card issuer, or other type of financial service entity that generates, provides, manages, and/or maintains financial service accounts. Financial services system 130 may store information about accounts and include, for example, credit card accounts, loan accounts, checking accounts, savings accounts, reward accounts, loyalty program accounts, debit card accounts, cryptocurrency accounts, and/or other types of financial service accounts known to those skilled in the art. Financial services system 130 may include infrastructure and components that are configured to generate and/or provide financial service accounts such as credit card accounts, checking accounts, debit card accounts, loyalty or reward programs, lines of credit, and the like. Financial services system 130 may authorize or decline credit card authorization requests and may issue authorization codes.

Online resources 140 may include one or more servers or storage services provided by an entity such as a provider of website hosting, networking, cloud, or backup services. In some embodiments, online resources 140 may be associated with hosting services or servers that store web pages for merchant systems 160. In other embodiments, online resources 140 may be associated with a cloud computing service such as Microsoft Azure™ or Amazon Web Services™. In yet other embodiments, online resources 140 may be associated with a messaging service, such as, for example, Apple Push Notification Service, Azure Mobile Services, or Google Cloud Messaging. In such embodiments, online resources 140 may handle the delivery of messages and notifications related to functions of the disclosed embodiments, such as credit card authorization creation, credit card authorization alerts, and/or completion messages and notifications.

Client devices 150 may include one or more computing devices configured to perform one or more operations consistent with disclosed embodiments. For example, client devices 150 may include a desktop computer, a laptop, a server, a mobile device (e.g., tablet, smart phone, etc.), a gaming device, a wearable computing device, or other type of computing device with communications capability. Client devices 150 may include one or more processors configured to execute software instructions stored in memory, such as memory included in client devices 150. Client devices 150 may include software that when executed by a processor performs known Internet-related communication and content display processes. For instance, client devices 150 may execute browser software that generates and displays interfaces including content on a display device included in, or connected to, client devices 150. Client devices 150 may execute applications that allow client devices 150 to communicate with components over network 170, and generate and display content in interfaces via display devices included in client devices 150. The disclosed embodiments are not limited to any particular configuration of client devices 150. For instance, a client device 150 may be a mobile device that stores and executes mobile applications that provide functions offered by prediction system 110 and/or online resources 140, such as providing information about merchant systems 160. In certain embodiments, client devices 150 may be configured to execute software instructions relating to location services, such as GPS locations. For example, client devices 150 may be configured to determine a geographic location and provide location data and time stamp data corresponding to the location data.

Merchant systems 160 may include one or more entities that provide goods, services, and/or information, such as a retailer (e.g., Macy'S®, Target®, etc.), a grocery store, an entertainment venue (e.g. cinema, theater, museum, etc.), a service provider (e.g., utility company, etc.), a restaurant, a bar, a non-profit organization (e.g., ACLU™, AARP®, etc.) or other type of entity that provides goods, services, and/or information that consumers (e.g., end-users or other business entities) may purchase, consume, use, etc. Merchant systems 160 are not limited to entities associated with any particular business, specific industry, or distinct field.

Merchant systems 160 may include one or more computing systems, such as servers, that are configured to execute stored software instructions to perform operations associated with a merchant, including one or more processes associated with processing purchase transactions, generating transaction data, generating product data (e.g., stock keeping unit (SKU) data) relating to purchase transactions, etc.

In some embodiments, merchant systems 160 may be physical "brick-and-mortar" locations that a consumer may physically visit and purchase goods and services. Such physical locations may include merchant paying system 162, which may include computing devices that perform financial service transactions with consumers (e.g., Point-of-Sale (POS) terminal(s), kiosks, etc.). Merchant paying system 162 may include one or more computing devices configured to perform operations consistent with facilitating purchases at merchant systems 160. Merchant paying system 162 may also include back- and/or front-end computing components that store data and execute software instructions to perform operations consistent with disclosed embodiments, such as computers that are operated by employees of the merchant (e.g., back office systems, etc.).

While merchant paying system 162 is shown within merchant systems 160 in FIG. 1, in some embodiments merchant paying system 162 may be separated from merchant 160. For example, merchant paying system 162 may be a different entity that services merchant systems 160. In such embodiments, merchant systems 160 may provide goods and/or services via online solutions. Merchant systems 160 may sell goods via a website to market, sell, and process online transactions. Then, merchant paying system 162 may provide an infrastructure for online payments.

In some embodiments, merchant paying system 162 may include a point-of-sale terminal 166. In particular, a financial card purchase may be carried out by presenting a financial card at a point-of-sale terminal 166. Data associated with the financial card may be provided to payment processor 164, and payment processor 164 may process payment the purchase. For example, payment processor 164 may generate the credit card authorization and include the time stamp and information about the merchant.

For each purchase, merchant paying system 162 may collect and/or maintain data identifying the financial card that has been used to make the purchases at merchant systems 160. Additionally, merchant paying system 162 may collect and/or maintain data identifying a customer associated with the financial card and/or data identifying a date on which the purchase was made. The merchant paying system 162 may collect and/or maintain other data as well. Data collected and/or maintained by merchant paying system 162 may be provided to databases 180, model generator 120, and/or prediction system 110.

In some embodiments, payment processor 164 may be a device configured to collect credit card information and issue credit card authorizations. Payment processor 164 may be a magnetic stripe reader that collects credit card information and connects with a credit card network. In such embodiments, payment processor 164 may include software to append information to the credit card authorization or issue new notifications that facilitate hours-of-operation modeling. For example, payment processor 164 may include a program to flag a credit card authorization, append a time stamp based on a location code (e.g. Zip Code™, and specify the merchant's address.

In some embodiments, to simplify the collection of data, payment processor 164 may also be connected to databases 180. In such embodiments, payment processor 164 may include a communication device that sends information to both financial services system 130 (i.e., acquirer bank) and databases 180. In such embodiments, when payment processor 164 is used to complete a credit card transaction, payment processor 164 may issue a simplified authorization with only time, date, and location. The simplified authorization may then be transmitted to databases 180 and be later used by prediction system 110 or model generator 120. The simplified authorization improves transmission rates and facilitates selection of authorizations for modeling hours of operation or popular hours. For instance, simplified credit card authorization records may be easier to filter and sort. In yet other embodiments, payment processor 164 may add information to the credit card authorization for the prediction model. For example, payment processor 164 may append local time and merchant ID to the authorization before sending it to databases 180 and/or financial services system 130.

Databases 180 may include one or more computing devices configured with appropriate software to perform operations consistent with providing prediction system 110 and model generator 120 with data associated with merchant systems 160. Databases 180 may include, for example, Oracle™ databases, Sybase™ databases, or other relational databases or non-relational databases, such as Hadoop™ sequence files, HBase™, or Cassandra™. Database(s) 180 may include computing components (e.g., database management system, database server, etc.) configured to receive and process requests for data stored in memory devices of the database(s) and to provide data from the database(s).

Data associated with merchant systems 160 may include, for example, historical data identifying authorizations associated with financial cards used to make purchases at merchant systems 160. A financial card may represent any manner of making a purchase at merchant systems 160. A financial card may be, for example, a financial services product associated with a financial service account, such as a bank card, key fob, or smartcard. For example, a financial card may comprise a credit card, debit card, loyalty card, or other similar financial services product. In some embodiments, a financial card may comprise a digital wallet or payment application. Thus, a financial card is not limited to a specific physical configuration and may be provided in any form capable of performing the functionality of the disclosed embodiments. In some embodiments, a financial card may include or be included in a mobile device; a wearable item, including jewelry, a smart watch, or any other device suitable for carrying or wearing on a customer's person. Other financial cards are possible as well. Data identifying financial cards used to make purchases at merchant systems 160 may include, for example, dates on which the purchases were made at merchant systems 160 and identification of customers associated with the financial cards.

Data associated with merchant systems 160 may further include, for example, data identifying financial cards, dates on which credit card authorizations were issued, and times of the day when credit card authorizations were issued. In some embodiments, data associated with merchant systems 160 may further include data describing merchant paying system 162. Data describing merchant systems 160 may include, for example, data identifying a brand or operator of merchant paying system 162, data identifying a merchant type associated with merchant systems 160 (e.g., restaurant, grocery, hair cutter, clothing retailer, etc.), data identifying a geographic location of merchant systems 160 (e.g., Zip Coder™, county, state, etc.), data describing a point-of-sale terminal 166 used at merchant systems 160 (e.g., terminal manufacturer, terminal hardware, terminal software, etc.), and/or data describing a payment processor 164 used by merchant systems 160 (e.g., processor operator, processor hardware, processor software, etc.). The data describing payment processor 164 used by the merchant systems 160 may include an indication that a reduced authorization is appended to the authorization.

While databases 180 are shown separately, in some embodiments databases 180 may be included in or otherwise related to one or more of prediction system 110, model generator 120, financial services system 130, and online resources 140.

Databases 180 may be configured to collect and/or maintain the data associated with merchant systems 160 and provide it to the prediction system 110, model generator 120, financial services system 130, and client devices 150. Databases 180 may collect the data from a variety of sources, including, for instance, merchant systems 160, payment processor 164, model generator 120, and/or third-party systems (not shown). Other sources of data associated with merchant systems 160 are possible as well. Databases 180 are further described below in connection with FIG. 4.

Model generator 120 may include one or more computing systems configured to generate prediction models to estimate hours of operations using credit card authorizations. Model generator 120 may receive or obtain information from databases 180, merchant systems 160, online resources 140, and financial services system 130. For example, model generator 120 may receive credit card authorization records from databases 180 and merchant systems 160. Model generator 120 may also receive information about hours of operation from online resources 140 and financial services system 130.

In some embodiments, model generator 120 may receive requests from prediction system 110. As a response to the request, model generator 120 may generate one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some embodiments, prediction models may cluster points of data in functional groups such as "random forests." Random forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via weighted connections. Prediction models may additionally or alternatively include classification and regression trees, or other types of models known to those skilled in the art. Model generator 120 may submit models to predict hours of operation and to estimate how busy merchant's may be at a time of the day. To generate prediction models, model generator 120 may analyze information applying machine-learning methods. Model generator 120 may communicate back with prediction system 110 via network 170 or other communication avenues. Model generator 120 is further described below in connection with FIG. 3.

Prediction system 110 may include one or more computing systems configured to perform one or more operations consistent with modeling the hours of operation and estimating popular hours of merchant systems 160. In some embodiments, prediction system 110 may receive a request for information. Prediction system 110 may receive the request directly from client devices 150 or, alternatively, may receive the request from other components of system 100. For example, client devices 150 may send requests to online resources 140, which then sends requests to prediction system 110. The request may specify a merchant, a day of the week; and/or other parameters, such as a specific date. In other embodiments, the request may be done for a plurality of merchants and a minimum prediction confidence.

As a response to information requests, prediction system 110 may request prediction models from model generator 120. The request may include information about the merchant. The request may additionally specify a day of the week. In addition, prediction system 110 may retrieve information from databases 180.

Prediction system 110 may generate a prediction result based on the information received from the client request and transmit the information to the client device. Prediction system 110 may plot the prediction result. Prediction system 110 is further described below in connection with FIG. 2.

FIG. 1 shows prediction system 110 and model generator 120 as different components. However, prediction system 110 and model generator 120 may be implemented in the same computing system. For example, prediction system 110 and model generator 120 may be embodied in a single server.

Network 170 may be any type of network configured to provide communications between components of system 100. For example, network 170 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
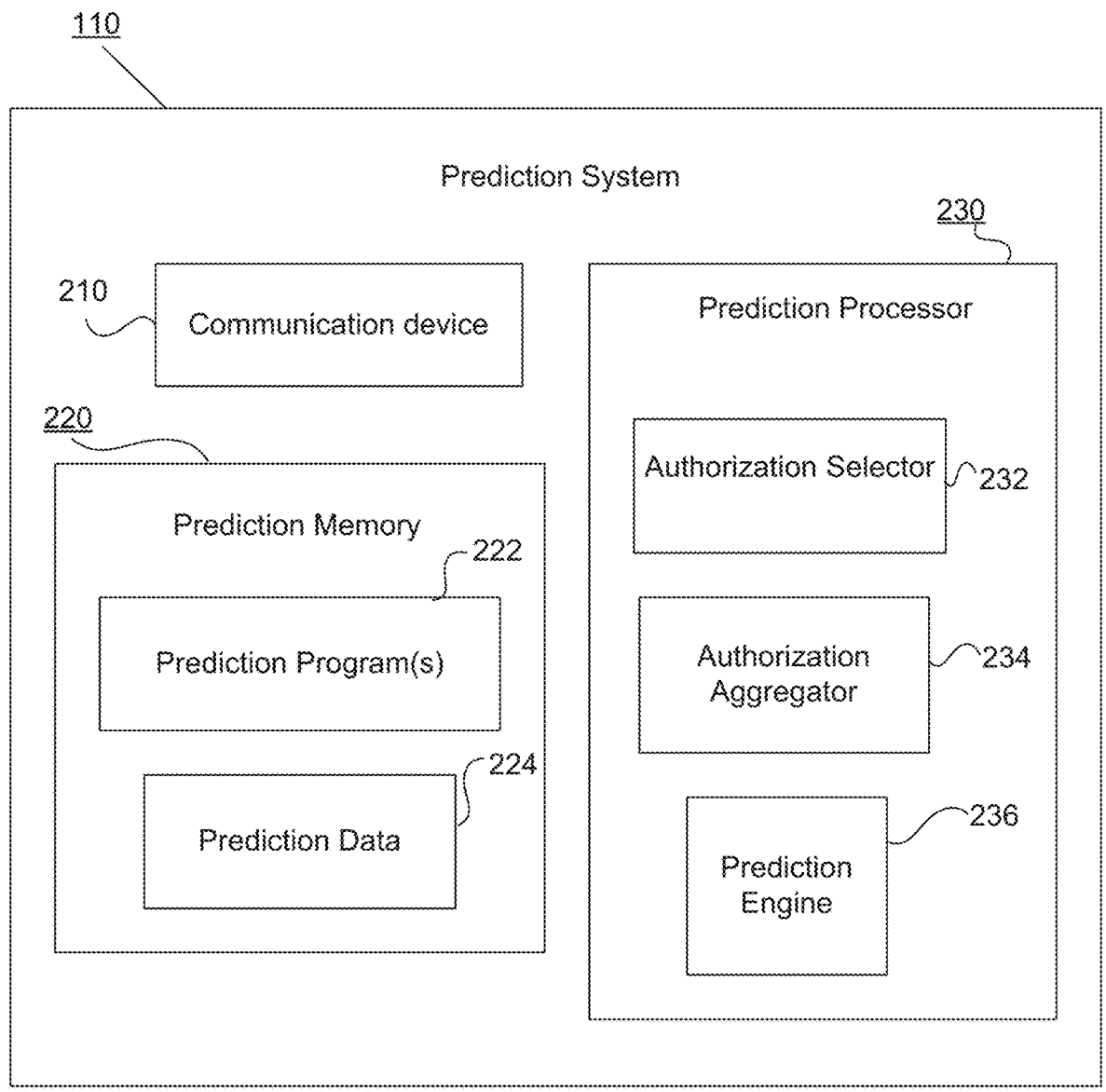
FIG. 2 is a block diagram of an exemplary prediction system, consistent with disclosed embodiments.

FIG. 2 is a block diagram of an exemplary prediction system, consistent with disclosed embodiments. Prediction system 110 may include a communication device 210, a prediction memory 220, and one or more prediction processors 208. Prediction memory 220 may include prediction programs 222 and prediction data 224. Prediction processor 230 may include an authorization selector 232, an authorization aggregator 234, and a prediction engine 236.

In some embodiments, prediction system 110 may take the form of a server, general purpose computer, mainframe computer, or any combination of these components. Other implementations consistent with disclosed embodiments are possible as well.

Communication device 210 may be configured to communicate with one or more databases, such as databases 180 described above. In particular, communication device 210 may be configured to receive from the database data associated with merchant systems 160. In addition, communication device 210 may be configured to communicate with other components as well, including, for example, merchant payment system 166 and model generator 120.

Communication device 210 may include, for example, one or more digital and/or analog devices that allow communication device 210 to communicate with and/or detect other components, such as a network controller and/or wireless adaptor for communicating over the Internet. Other implementations consistent with disclosed embodiments are possible as well.

Prediction memory 220 may include one or more storage devices configured to store instructions used by prediction processor 230 to perform functions related to disclosed embodiments. For example, prediction memory 220 may store software instructions, such as prediction program 222, that may perform one or more operations when executed by prediction processor 230. The disclosed embodiments are not limited to separate programs or computers configured to perform dedicated tasks. For example, prediction memory 220 may include a single prediction program 222 that performs the functions of prediction system 110, or prediction program 222 may comprise multiple programs. Prediction memory 220 may also store prediction data 224 that is used by prediction program(s) 222.

In certain embodiments, prediction memory 220 may store sets of instructions for carrying out processes to model hours of operation, generate a prediction list of popular hours, and/or generate a posted transaction array, described below in connection with FIGS. 6-8. In certain embodiments, prediction memory 220 may store sets of instructions for generating graphical objects, such as the ones described below in connection with FIGS. 11-13. Other instructions are possible as well. In general, instructions may be executed by prediction processor 230 to perform one or more processes consistent with disclosed embodiments.

In some embodiments, prediction processor 230 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, prediction processor 230 may be a plurality of devices coupled and configured to perform functions consistent with the disclosure.

Prediction processor 230 may include an authorization selector 232, an authorization aggregator 234, and a prediction engine 236. In some embodiments, prediction processor 230 may execute software to perform functions associated with each component of prediction processor 230. In other embodiments, each component of prediction processor 230 may be an independent device. In such embodiments, each component may be hardware configured to specifically process data or perform operations associated with modeling hours of operation or popular hours, generating prediction models and/or handling large data sets. For example, authorization selector 232 may be a field-programmable gate array (FPGA), authorization aggregator 234 may be a Graphics processing unit (GPU), and prediction engine 236 may be a central processing unit (CPU). Other hardware combinations are also possible. In yet other embodiments, combinations of hardware and software may be used to implement prediction processor 230.

Authorization selector 232 may request selected credit card authorizations from databases 180 based on parameters such as a day of the week, a specific merchant, and/or a merchant identification. In response, communication device 210 may receive from databases 180 a set of credit card authorizations. The set of credit card authorizations may include multiple credit card authorizations recorded during a selectable or variable period of time. For example, the period of time may be selected to be at least one year, so the set of credit card authorizations represent every season throughout the year. Authorization selector 232 may select a subset of credit card authorizations that are associated with a merchant by filtering the data set. In some embodiments, authorization selector 232 may employ techniques such as the "pidgeonhole" principle, hierarchical verification, and PEX algorithms, to filter and select credit card authorizations. In some embodiments, authorization selector 232 may compare specific fields of the credit card authorization to accept or discard authorizations. For example, authorization selector 232 may select credit card authorizations using information appended by payment processor 164.

In some embodiments, prediction processor 230 may implement authorization selector 232 by executing instructions to create an environment in which credit card authorizations are selected. In other embodiments, however, authorization selector 232 may be a separate device or group of devices. In such embodiments, authorization selector 232 may include hardware configured to carry out filtering tasks. For example, to improve performance and minimize costs, authorization selector 232 may be an SRAM-based FPGA that functions as authorization selector 232. Authorization selector 232 may have an architecture designed for implementation of specific algorithms. For example, authorization selector 232 may include a Simple Risc Computer (SRC) architecture or other reconfigurable computing system.

Authorization aggregator 234 may determine time intervals and create a frequency table for the intervals. The frequency table may represent the number of authorizations that were issued during a specific time interval for a merchant. Authorization aggregator 234 may create the frequency table using time stamps associated with the credit card authorizations. For example, authorization aggregator 234 may receive a group of credit card authorizations such as shown in Table 1, below, and calculate a frequency table of authorizations using the time intervals presented in Table 2.

TABLE 1

| Authorization No. | Time | Merchant | Amount |
| --- | --- | --- | --- |
| 1458 | 11:30 | A | $58 |
| 3221 | 11:32 | A | $23 |
| 4434 | 11:45 | A | $93 |
| 6244 | 12:40 | A | $11 |
| 7985 | 12:41 | A | $13 |
| 9499 | 12:42 | A | $61 |
| 10765 | 16:40 | A | $92 |
| 12164 | 16:45 | A | $24 |

TABLE 2

| Time interval | Frequency |
| --- | --- |
| 11:30-12:00 | 3 |
| 12:30-13:00 | 2 |
| 16:30-17:00 | 2 |

Prediction processor 230 may implement authorization aggregator 234 by executing software to create an environment for aggregation of credit card authorizations. However, in other embodiments authorization aggregator 234 may include independent hardware with specific architectures to improve the efficiency of aggregation or sorting processes. For example, authorization aggregator 234 may be a GPU array configured to sort credit card authorizations. In some embodiments, authorization aggregator 234 may be configured to implement sorting algorithms such as, for example, radix sort. Alternatively or additionally, authorization aggregator 234 may be configured to implement a programming interface, such as Apache Spark, and execute data structures, cluster managers, and/or distributed storage systems. For example, authorization aggregator 234 may include a resilient distributed dataset that is manipulated with a standalone software framework and/or a distributed file system.

Prediction engine 236 may calculate a prediction indication based on one or more models and a selected credit card authorization data set. For example, prediction engine 236 may use a model from model generator 120 and apply inputs based on a posted transaction array to generate a prediction list of hours of operation for merchant 160. In other embodiments, prediction engine 236 may calculate a prediction of a merchant's busy hours.

Prediction engine 236 may be implemented by prediction processor 230. For example, prediction processor 230 may execute software to create an environment to execute models. However, in other embodiments prediction engine 236 may include hardware configured to carry out parallel operations. Some hardware configurations improve the efficiency of calculations, particularly when multiple calculations are being processed in parallel. For example, prediction engine 236 may include multicore processors or computer clusters to divide tasks and quickly perform calculations. In some embodiments, prediction engine may receive a plurality of models from model generator 120. In such embodiments, prediction engine 236 may include a scheduling module. The scheduling module may receive models and assign the models to independent processors or cores. In other embodiments, prediction engine 236 may be FPGA Arrays to provide greater performance and determinism.

The components of prediction system 110 may be implemented in hardware, software, or a combination of both, as will be apparent to those skilled in the art. For example, although one or more components of prediction system 110 may be implemented as computer processing instructions embodied in computer software, all or a portion of the functionality of prediction system 110 may be implemented in dedicated hardware. For instance, groups of GPUs and/or FPGAs maybe used to quickly analyze data in prediction processor 230.

Figure 3:
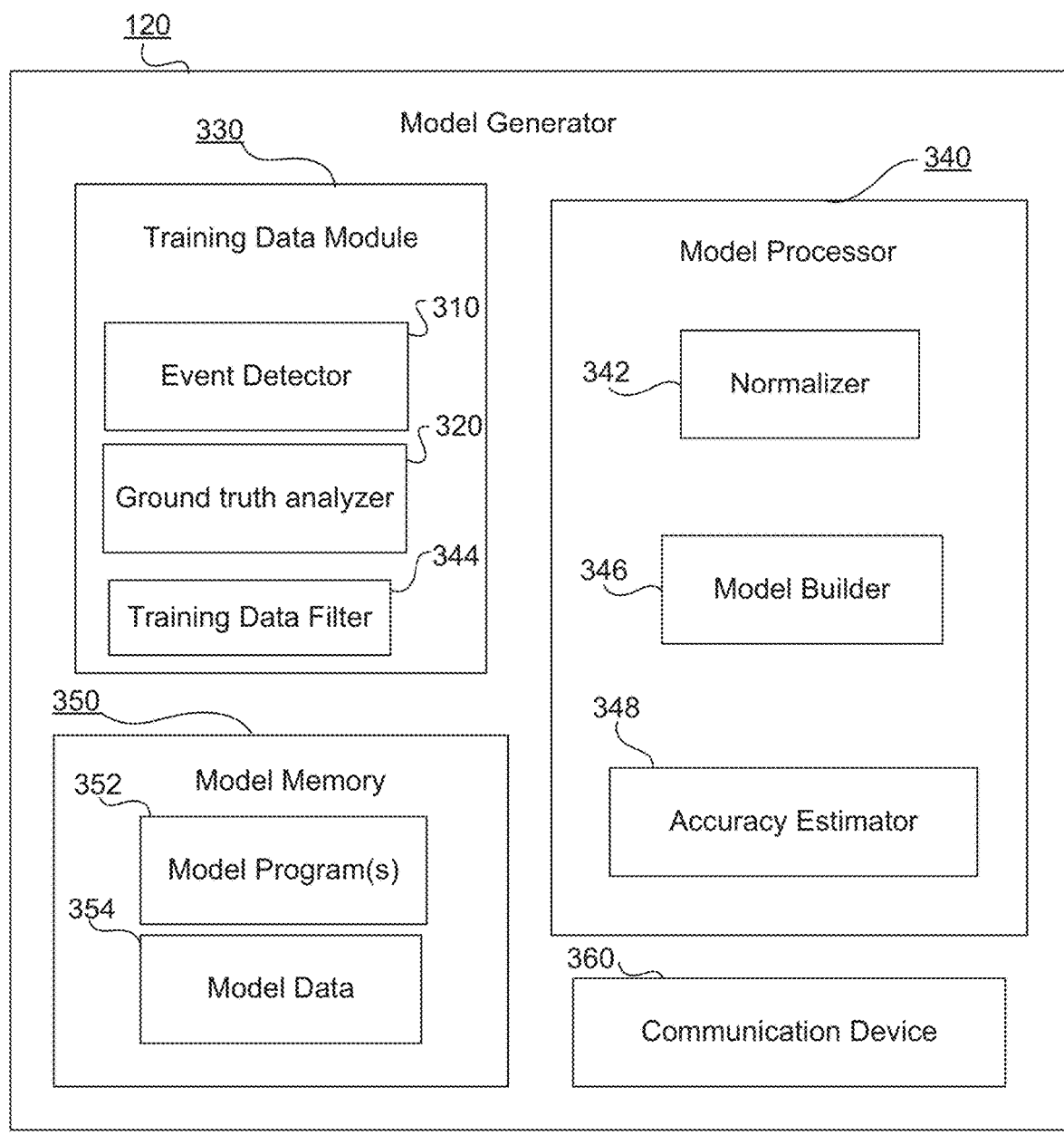
FIG. 3 is a block diagram of an exemplary model generator, consistent with disclosed embodiments.

FIG. 3 is a block diagram of an exemplary model generator, consistent with disclosed embodiments. Model generator 120 may include a training data module 330, a model processor 340, a model memory 350, and a communication device 360.

One of the fundamental challenges in obtaining accurate hours-of-operation predictions based on credit card authorization data is the lack of sufficient training data sets. Training data sets are sets of data used to discover potentially predictive relationships. They may include an input vector and an answer vector, that are used together to train an AI machine or a knowledge database. A training data set may only be sufficient when it includes a number of samples that enables an artificial intelligence machine or a regression model to be "trained" (e.g., initialized) with an acceptable confidence interval. Sufficient training data sets may include samples that represent the full distribution to be modeled and have enough samples to identify outliers and minimize deviations. In some embodiments, training data sets include a validation subset and a test subset. In such embodiments, each one of the subsets must include a representative sample size.

In some embodiments, training data sets associate credit card authorizations with ground truth hours of operation, that is, actual hours of operation information as specified by merchants and obtained directly or indirectly from the merchants. Training data sets may include information of brick-and-mortar merchants with "open" and "closed" hours, permanently closed merchants as negative controls (e.g., merchants that changed locations), and permanently open merchants as positive controls (e.g., online retailers). While collecting credit card authorization information issued by merchant systems 160 can be done by retrieving information from databases 180 or financial services system 130, there is no central source for ground truth of the hours of operation of merchant systems 160. In some embodiments model generator 120 may include a training data module 330 that monitors network 170 and online resources 140 to capture ground truth and facilitate generating the training data set. Training data module 330 may combine and select information to generate the training data sets used to generate prediction models.

Training data module 330 includes an event detector 310, a ground truth analyzer 320, and a training filter 332.

Event detector 310 may be a software or hardware module configured to detect events in network 170 that may be relevant to model generator 120. In some embodiments, event detector 310 may be configured to detect when merchant systems 160 issue a credit card authorization. In such embodiments, event detector 310 may signal model generator 120 to request the authorization information and build the training data set. In addition, event detector 310 may be configured to detect changes in online resources 140. For example, online resources 140 may include web sites operated by merchant systems 160. If the website is updated, event detector 310 may detect changes and request that ground truth analyzer 320 investigate the changes and update records. Event detector 310 may create a system to automatically update a training data set of hours of operation. Event detector 310 may detect merchant systems 160 that are actively issuing credit cards, and may have the ability to monitor changes of ground truth to automatically generate a training data set.

Merchant hours of operation and popular hours are dynamic. For example, businesses change their hours of operation, and temporarily or permanently open or close new locations. Event detector 310 may facilitate updating databases to keep up-to-date information by monitoring the network 170 and flagging transactions that can be used in the training data set.

Ground truth analyzer 320 may include software or hardware modules configured to collect and organize data that is associated with merchant systems 160. For example, ground truth analyzer 320 may be configured to collect hours of operation from online resources 140. Ground truth analyzer 320 may collect information using a "bot," such as a web scraper, to automatically fetch and extract information from websites such as Yellowpages.com™, Google™, or Yelp™. In some embodiments, ground truth analyzer 320 may download source code of web pages and parse, search, reformat, and copy data. Ground truth analyzer 320 may sort information to select information about merchant systems 160.

In some embodiments, ground truth analyzer 320 may use text pattern matching, HTML parsing, vertical aggregation, or semantic annotation recognizing, among other processes. Ground truth analyzer 320 may include tools to look for hours of operation. For example, in some embodiments a web scraper may be configured to look for text formats of "XX:XX-XX:XX" where X is a digit. In other embodiments, a web scraper may be configured to recognize labels in HTML code such as "<time itemprop="opening Hours">, "<datetime="Tu,Th 13:00-20:00">," or "<p>Open: Monday-Thursday 9 am-noon</p>."

In other embodiments ground truth analyzer 320 may include crowd-sourced services to obtain information about a merchant. In yet other embodiments, ground truth analyzer 320 may include a verification service that uses phone calls to retrieve information. For example, ground truth analyzer 320 may include an automated calling service that calls merchants phone numbers. In such embodiments, ground truth analyzer 320 may determine whether the merchant is open or closed based on the phone call response. For example, ground truth analyzer 320 may include auto dialer software that calls merchants. Ground truth analyzer 320 may determine that the businesses are open any time merchant systems 160 pick up the phone but assume merchant systems 160 are closed if there is no answer.

Training data module 330 may include software or hardware modules configured to create a training data set. Training data module 330 may create the training data set by combining credit card authorizations from a group of merchants and ground truth information for the same group of merchants. For example, communication device 360 may receive a collection of credit card authorizations generated by a group of merchants. If ground truth analyzer 320 has identified hours of operation about the same group of merchants, training data module 330 may combine these data sets to create a training data set that includes credit card authorizations and ground truth for a group of merchants.

Model processor 340 may include a processor similar to prediction processor 230. Model processor may include a data normalizer 342, a training data filter 344, and accuracy estimator 348, and a model builder 346.

Data normalizer 342 may include hardware or software modules configured to normalize information under certain parameters. For example, data normalizer 342 may normalize time stamps by expressing them in a common local time zone or in UTC time. Alternatively, data normalizer 342 may adjust time stamps based on a Zip Code™ associated with a merchant that issued a credit card authorization request.

Training data filter 344 may have a similar configuration to authorization selector 232 but instead of filtering credit card authorizations associated with merchant systems 160, training data filter 344 may select a training data subset before it is used to generate models. The accuracy of the model used to predict hours may vary significantly when different data sets are used. For example, predicting hours of operation of a restaurant using a training data set that is based on grocery stores may undermine the prediction's accuracy. For this reason, training data filter 344 may be configured to select training data sets based on, for example, the category of the merchant in client devices 150 requests. Then, the training data set may be constrained to certain types of credit card authorizations or models.

Model builder 346 may be software or hardware configured to create prediction models based on the training data. In some embodiments, model builder 346 may generate decision trees. For example, model builder 346 may take training data to generate nodes, splits, and branches in a decision tree. Model builder 346 may calculate coefficients and hyper parameters of a decision tree based on the training data set. In other embodiments, model builder 346 may use Bayesian algorithms or clustering algorithms to generate predicting models. In yet other embodiments, model builder 346 may use association rule mining, artificial neural networks, and/or deep learning algorithms to develop models. In some embodiments, to improve the efficiency of the model generation, model builder 346 may be hardware configured to generate models for hours of operation or popular hours. For example, model builder 346 may be an FPGA.

Accuracy estimator 348 may be software or hardware configured to evaluate the accuracy of a model. For example, accuracy estimator may estimate the accuracy of a model, generated by model build 346, by using a validation dataset. In some embodiments, the validation data set is a portion of the training data set, that was not used to generate the prediction model. Accuracy estimator may generate error rates for each one of the prediction models. Accuracy estimator 348 may additionally assign weight coefficients to models based on the estimated accuracy.

Figure 4:
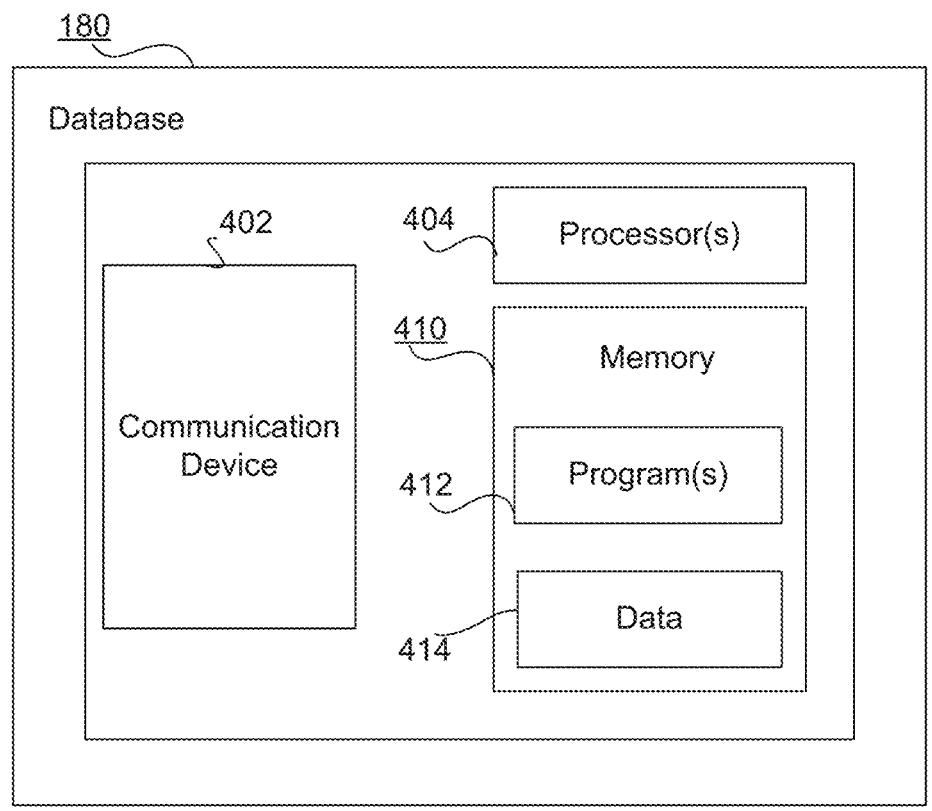
FIG. 4 is a block diagram of an exemplary database, consistent with disclosed embodiments.

FIG. 4 is a block diagram of an exemplary database 180, consistent with disclosed embodiments. Database 180 may include a communication device 402, one or more database processors 404, and database memory 410 including one or more database programs 412 and data 414.

In some embodiments, databases 180 may take the form of servers, general purpose computers, mainframe computers, or any combination of these components. Other implementations consistent with disclosed embodiments are possible as well.

Communication device 402 may be configured to communicate with one or more components of system 100, such as merchant systems 160, prediction system 110, model generator 120, and/or financial services system 130. In particular, communication device 402 may be configured to provide to the prediction system 110 and model generator 120 data associated with a number of merchants.

Communication device 402 may be configured to communicate with other components as well, including, for example, one or more merchant payment systems, such as merchant payment system 166 described above, and one or more financial services system 130 and/or online resources 140. Communication device 402 may take any of the forms described above for communication device 210.

Database processors 404, database memory 410, database programs 412, and data 414 may take any of the forms described above for prediction processors 230, memory 220, prediction programs 222, and prediction data 224, respectively. The components of databases 180 may be implemented in hardware, software, or a combination of both hardware and software, as will be apparent to those skilled in the art. For example, although one or more components of databases 180 may be implemented as computer processing instruction modules, all or a portion of the functionality of databases 180 may be implemented instead in dedicated electronics hardware.

Data 414 may be data associated with multiple merchants, such as merchants of merchant systems 160. Data 414 may include, for example, credit card authorization data. Data 414 may describe purchases made by customers at merchants using financial cards.

Figure 5:
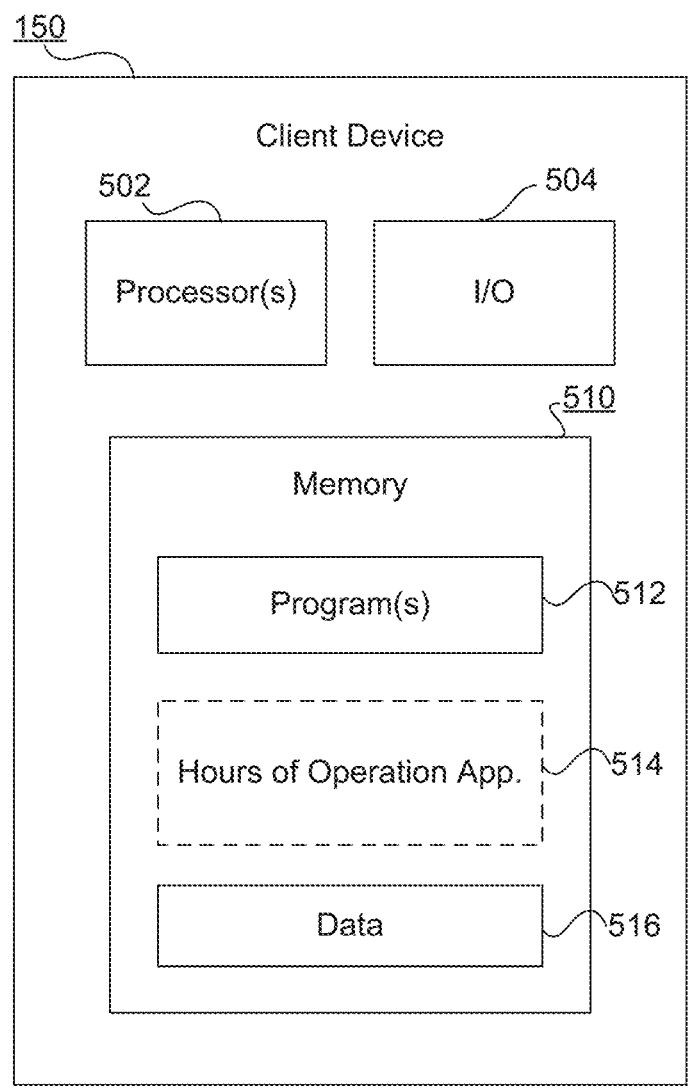
FIG. 5 is a block diagram of an exemplary client device, consistent with disclosed embodiments.

FIG. 5 is a block diagram of an exemplary client device, consistent with disclosed embodiments. In one embodiment, client devices 150 may include one or more processors 502, one or more input/output (I/O) devices 504, and one or more memories 510. In some embodiments, client devices 150 may take the form of mobile computing devices such as smartphones or tablets, general purpose computers, or any combination of these components. Alternatively, client devices 150 (or systems including client devices 150) may be configured as a particular apparatus, embedded system, dedicated circuit, and the like based on the storage, execution, and/or implementation of the software instructions that perform one or more operations consistent with the disclosed embodiments. According to some embodiments, client devices 150 may comprise web browsers or similar computing devices that access web site consistent with disclosed embodiments.

Processor 502 may include one or more known processing devices, such as mobile device microprocessors manufactured by Intel™, NVIDIA™, or various processors from other manufacturers. The disclosed embodiments are not limited to any specific type of processor configured in client devices 150.

Memory 510 may include one or more storage devices configured to store instructions used by processor 502 to perform functions related to disclosed embodiments. For example, memory 510 may be configured with one or more software instructions, such as programs 512 that may perform one or more operations when executed by processor 502. The disclosed embodiments are not limited to separate programs or computers configured to perform dedicated tasks. For example, memory 510 may include a single or multiple programs 512 that perform the functions of the client devices 150. Memory 510 may also store data 314 that is used by one or more programs 512.

In certain embodiments, memory 510 may store an hours-of-operation application 514 that may be executed by processor(s) 502 to perform one or more prediction processes consistent with disclosed embodiments. In certain aspects, hours-of-operation application 514, or another software component, may be configured to request predictions from prediction system 110 or determine the location of client devices 150. For instance, these software instructions, when executed by processor(s) 502 may process information to generate a request for hours of operation.

I/O devices 504 may include one or more devices configured to allow data to be received and/or transmitted by client devices 150 and to allow client devices 150 to communicate with other machines and devices, such as other components of system 100. For example, I/O devices 504 may include a screen for displaying optical payment methods such as Quick Response Codes (QR), or providing information to the user. I/O devices 504 may also include components for NFC communication. I/O devices 504 may also include one or more digital and/or analog devices that allow a user to interact with client devices 150 such as a touch-sensitive area, buttons, or microphones. I/O devices 504 may also include one or more accelerometers to detect the orientation and inertia of client devices 150. I/O devices 504 may also include other components known in the art for interacting with prediction system 110, merchant systems 160, and/or financial services system 130.

The components of client devices 150 may be implemented in hardware, software, or a combination of both hardware and software, as will be apparent to those skilled in the art.

Figure 6:
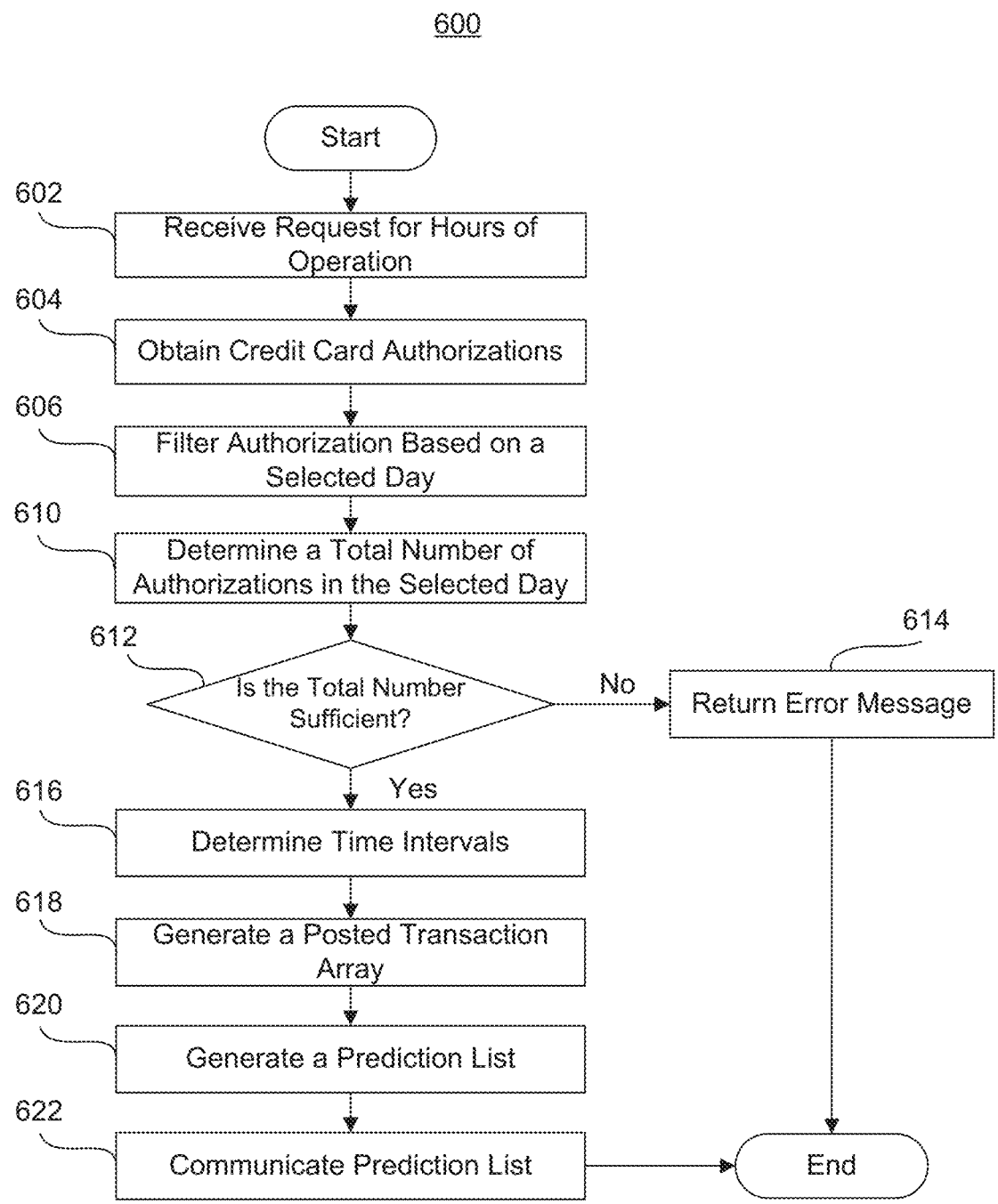
FIG. 6 is a flow chart illustrating an exemplary prediction process, consistent with disclosed embodiments.

FIG. 6 is a flow chart illustrating an exemplary prediction process 600, consistent with disclosed embodiments. In some embodiments, prediction process 600 may be executed by prediction system 110.

In step 602, prediction system 110 may receive requests for hours of operation from client devices 150, or other components of system 100. These requests may come in the form of an internet protocol message, a query data packet, or a port opening instruction, and may further include information of client devices 150 and specify one or more merchant systems 160. For example, the requests may specify names and/or identification numbers of a specific merchant system 160. The requests may also specify a day of the week to be used as a parameter to predict opening and closing times and/or a location associated with client devices 150 and merchant systems 160.

In step 604 prediction system 110 may obtain credit card authorizations associated with the one or more merchant systems 160 specified in the requests. For example, prediction system 110 may query databases 180 to obtain all the credit card transactions that have been issued by the merchant systems 160 associated with the requests. In some embodiments, prediction system 110 may limit the query to a subset of the credit card authorizations issued by merchant systems 160. For example, prediction system 110 may request only credit card authorizations that have been issued for a specific day. Also, prediction system 110 may request credit card authorizations issued in the last year, in the last month, or between two dates.

In step 606, prediction system 110 may filter, or select, a portion of the data received from the database based on information contained in the received requests. For example, in embodiments where prediction system 110 retrieves all credit card authorizations issued by a merchant, prediction system 110 may select credit card authorizations issued on the day of the week specified in the request. In other applications, prediction system 110 may select only credit card authorizations above certain dollar amount. In yet other applications, prediction system 110 may receive a set of credit card authorizations and determine a subset of credit card authorizations based on the requests. For example, prediction system 110 may determine a subset of credit card authorizations based on day of the week specified by the request.

In some embodiments, prediction system 110 may filter the credit card authorization data retrieved from databases 180 to simplify future analysis. In such embodiments, authorization selector 232 may curate and classify credit card data authorizations. For example, authorization selector 232 may use information from the requests issued by client devices 150 to create a subset of credit card authorizations. Authorization selector 232 may use information associated with credit card authorizations to select or discard authorizations. For example, authorization selector 232 may discard authorizations that are not generated in within the specified day of the week. Also, authorization selector 232 may remove transactions considered abnormal. For example, authorization selector 232 may disregard authorizations that have a dollar amount significantly different from the other authorizations. Such authorizations may represent credit card activity that is not related with hours of operation. For example, a merchant that wholesales to other businesses may make large sales after hours to a selected distributor while the merchant is not being open to the public. Those transactions that do not correlate with hours of operation may be filtered based on transaction amount or other related parameters.

In some embodiments prediction system 110 and authorization selector 232 may use data-mining algorithms to efficiently curate, parse, and/or filter the credit card authorizations. For example, prediction system 110 may use algorithms such as C4.5, Support Vector Machines, Apriori algorithm, Expectation-maximization algorithm, among others, to handle large data sets of credit card authorizations.

In step 610 prediction system 110 may determine a total number of authorizations for the selected day authorizations subset. In some embodiments, prediction system 110 may aggregate the number of authorizations to determine a total number of authorizations for the specified day of the week.

In step 612, prediction system 110 may determine whether the quantity of credit card authorizations is sufficient to make an accurate prediction. In some embodiments, prediction system 110 may determine a threshold number of transactions over a period of time. For example, prediction system 110 may set a threshold of 50 transactions over a 5-month period. If the threshold is not met, then prediction system 110 may determine that the quantity of authorizations is insufficient. In other embodiments, prediction system 110 may determine that the quantity of credit card authorizations is not sufficient if the oldest record is less than 5 months old. In yet other embodiments, prediction system 110 may determine the quantity is not sufficient if a requested prediction accuracy cannot be met with the available records. For example, client devices 150 may request a minimum prediction accuracy of 90%. Prediction system 110 may determine a minimum quantity of credit card authorizations required to achieve the requested prediction accuracy. If the available quantity of credit card authorizations is less than the determined minimum, prediction system 110 may return an error message reporting that there are not enough records to make the prediction.

If prediction system 110 determines that there is not enough data, process 600 continues to step 614, in which the prediction system may return an error message. In some embodiments, the error message may be sent to online resources 140 which then may send a message to client devices 150. In such embodiments, online resources 140 may transmit default values for hours of operation to client devices 150 or simply not send any data for hours of operation. Additionally or alternatively, prediction system 110 may send the error message to merchant systems 160 to indicate that potential customers cannot access hours of operation. Alternatively, if prediction system 110 determines that there is enough data, it continues to step 616.

In step 616, prediction system 110 determines time intervals for the hours of operation analysis, for example, 30 minutes. In some embodiments, the time intervals may be determined based on a classification for a merchant of a specified merchant system 160. In other embodiments, the time intervals may be based on the requests for information. In yet other embodiments, prediction system 110 may determine time intervals based on time rules.

Time rules may instruct prediction system 110 to determine time intervals with equal time length that do not overlap each other. Also, time rules may instruct prediction system 110 to have time intervals wherein the sum of time lengths equals one day. Time rules may additionally instruct prediction system 110 to determine time intervals of 30 minutes. For example a full day may be divided in 48-time intervals of half an hour. Half hour time intervals facilitate the prediction process as they match with standard business hours. Alternatively, time rules may instruct prediction system 110 to determine time intervals of other or varying length and that may or may not overlap with each other.

In step 618, prediction system 618 may generate a posted transactions array. The posted transaction array may associate the determined time intervals with an aggregated number of transactions. For example, authorization aggregator 234 may utilize the plurality of times to generate an array that indicates how many transactions were recorded for a given time period.

In some embodiments, prediction system 110 may adjust the posted transactions array based on the total number of authorizations for the selected day. For example, authorization aggregator 234 may normalize the number of aggregated authorizations using the total number of transactions. In such embodiments, prediction system 110 may use the total number of authorizations to prevent over reliance in a single merchant. Using the absolute number of transactions to create prediction models may result in a model dominated by large merchants that post many transactions. Such models may be inaccurate when predicting hours of operation of smaller merchants or may result in models that have poor adaptation. Thus, prediction system 110 may adjust the posted transactions using the total number of authorizations to smooth the effect of large merchants with many transactions and extract patterns that are insensitive to absolute volume of transactions (e.g., normalizing).

In step 620, prediction system 110 generates a prediction list. In some embodiments, prediction system 110 generates the prediction list by determining, for each one of the time intervals in the posted transaction array, prediction probabilities. The prediction probabilities may be calculated using prediction models from model generator 120. Each prediction model may output a model result, which may be a probability between 0-100%.

Step 620 may be carried out by prediction engine 236, which may compute a probability of a merchant being open or closed. For example, in step 620 prediction system 110 may request from model generator 120 one or more models to predict hours of operation for a selected merchant. Prediction system 110 may then send prediction models and credit card authorization data to prediction engine 236 to perform the probability calculations.

In some embodiments, prediction engine 236 may receive a plurality of models from model generator 120 and compute probabilities independently for each one of the models. Prediction engine 236 may then tally the prediction model results. In such embodiments, prediction engine 236 may determine accuracy values for the models and model results. For example, based on the evaluation performed by accuracy estimator 348, prediction engine 236 may determine an accuracy value for each model and each model result. Then prediction engine 236 may assign weighting coefficients to the models based on the accuracy values. In such embodiments, prediction engine 236 may modify the computed probabilities for the models (i.e. the model results) using the assigned weighting coefficient to calculate a total prediction. For example, total prediction may be defined by:

$$TotalPrediction = \frac{\sum_{i=0}^{j} \alpha_i * MR_i}{N}$$

where TotalPrediction is the value to be stored in the prediction list, j is the total number of models retrieved from model generator 120, $\alpha$ is the assigned coefficient (which is a function of the determine accuracy), MR is the model result for one prediction model, and N is a normalization value. Thus, prediction engine 236 may add modified tree results to determine a total prediction. The total prediction may be used to determine a prediction indication, such as "open" or "closed."

In step 622, prediction system 110 may communicate the results list to the client that issued the request. For example, prediction system 110 may communicate the request with a list of Boolean values indicating whether the merchant is open or closed during each half-hour interval of the day for the day of the week as specified in the original request.

Figure 7:
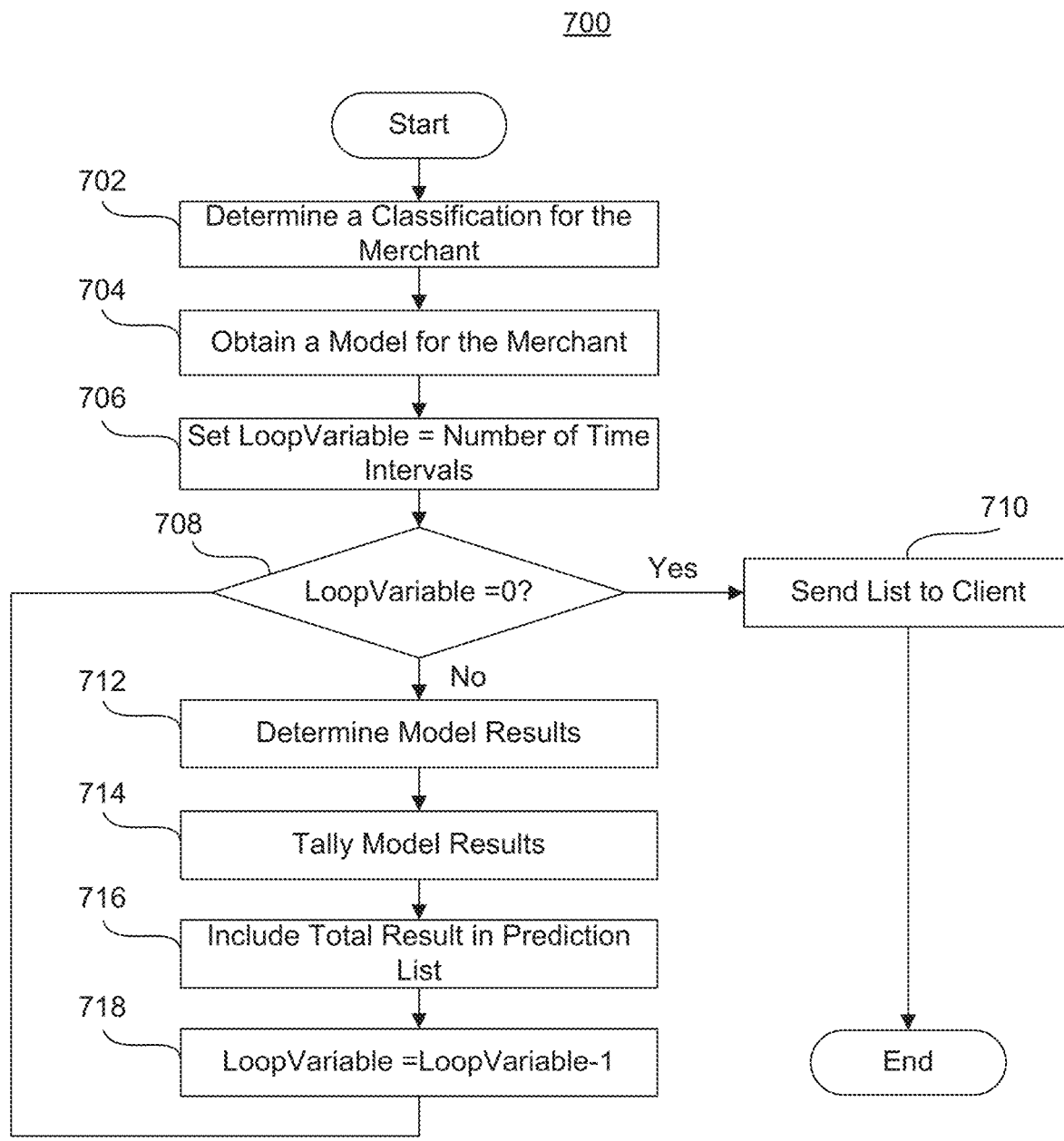
FIG. 7 is a flow chart illustrating an exemplary prediction list generation process, consistent with disclosed embodiments.

FIG. 7 is an exemplary flow chart illustrating a prediction list generation process, consistent with disclosed embodiments. Prediction list generation process 700 may be carried out by prediction system 110.

In step 702, prediction system 110 may determine whether there is a classification associated with the merchant. For example, prediction system 110 may determine if the merchant to be analyzed is a restaurant, a grocery store, a bar, etc. It may do so using the credit card authorization data retrieved from the databases 180. For example, in some embodiments prediction system 110 may use Federal Identification Codes (FIC) in the credit card authorization requests to determine a merchant classification.

In step 704, prediction system 110 may obtain a model for the merchant. In some embodiments, prediction system 110 may send a request to model generator 120 to generate prediction models for the merchant. Model generator 120 may respond with one or more prediction models for the merchant based on, for example, the classification for the merchant and the day of the week. For instance, model generator 120 may send to prediction system 110 a group of prediction models specifically for restaurants open on Saturdays.

In step 706, prediction system 110 may prepare to carry out an iterative calculation to estimate a prediction indication for each one of the time intervals. The status of the looping variable is then tested in step 708. If the looping variable indicates the iterative process is culminated, prediction system 110 may send the prediction list to the client in step 710. Alternatively, if the looping variable indicates the iterative process is not culminated, prediction system 110 may continue to step 712 and calculate a prediction for a time interval using the group of models. To carry out step 712 prediction system 110 may send a request for calculation to prediction engine 236.

In step 712, prediction system 110 may tally results of prediction models as previously disclosed for step 620 and save the estimated total prediction in a prediction list in step 716. In some embodiments, prediction system 110 may generate a prediction indication based on the total prediction value. In some embodiments, the prediction indication may be a Boolean value, such as "open" or "closed" value. In other embodiments, the prediction indication may represent a status associated with the total prediction value. For example, the prediction indication may be "likely open," "likely closed," "out of business," or "24/7 open."

In step 718, prediction system 110 may modify the looping variable to continue the iterations.

Figure 8:
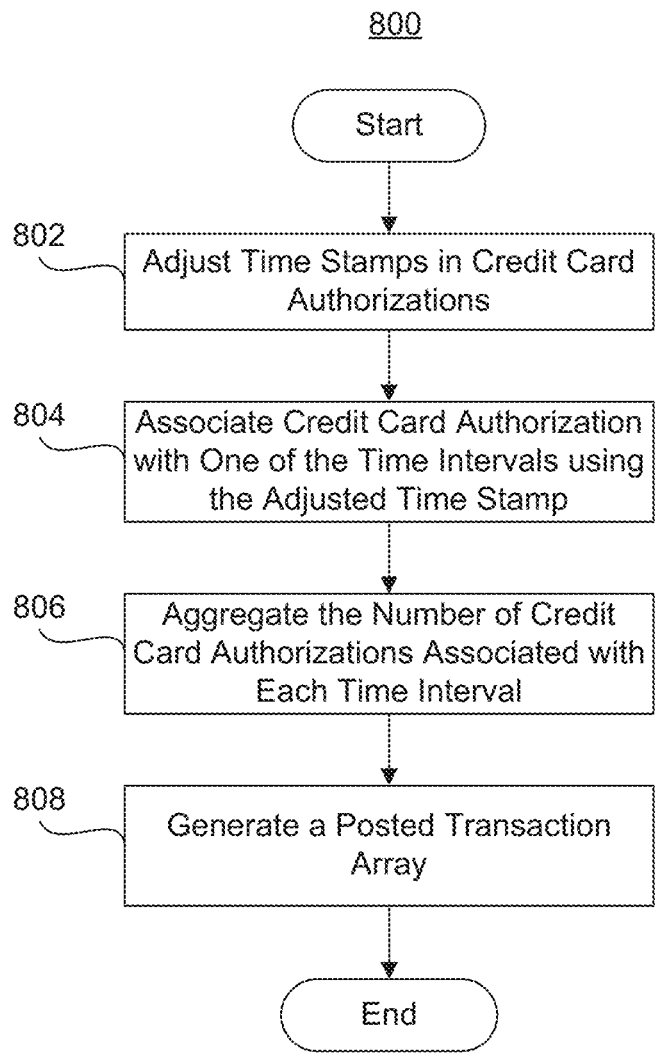
FIG. 8 is a flow chart illustrating an exemplary posted transaction array generation process, consistent with disclosed embodiments.

FIG. 8 is an exemplary flow chart illustrating a posted transaction array generation process, consistent with disclosed embodiments. Posted transaction array generation process 800 may be carried out by prediction system 110.

In step 802, prediction system 110 may adjust information in the credit card authorizations. For example, in some embodiments the credit card authorizations may comprise time stamps. In such embodiments, prediction system 110 may adjust the time stamps in credit card authorizations based on a location code associated with merchant systems 160 to facilitate generating the prediction list. For example, a credit card authorization system may always record time stamps in Eastern Standard Time, regardless of merchant's 160 location. Then prediction system 110 may adjust the time stamp of the credit card authorization based on a location code associated with the merchant. For example, prediction system 110 may adjust time stamps using the Zip Codes™ of merchant systems 160.

In step 804, prediction system 110 may associate the credit card authorization with a time interval. In some embodiments, prediction system 110 may sort credit card authorizations using the time stamp associated with the credit card authorizations. In such embodiments, prediction system 110 may utilize sorting algorithms to process data and obtain the categories that associate time intervals and the credit card authorizations.

In step 806, prediction system 110 may aggregate the number of authorizations issued within the time intervals to generate a frequency table that quantifies the number of times a credit card authorization was issued for in a time interval.

In step 808, prediction system 110 may generate a posted transaction array using the information of the number of authorizations and data.

Figure 9:
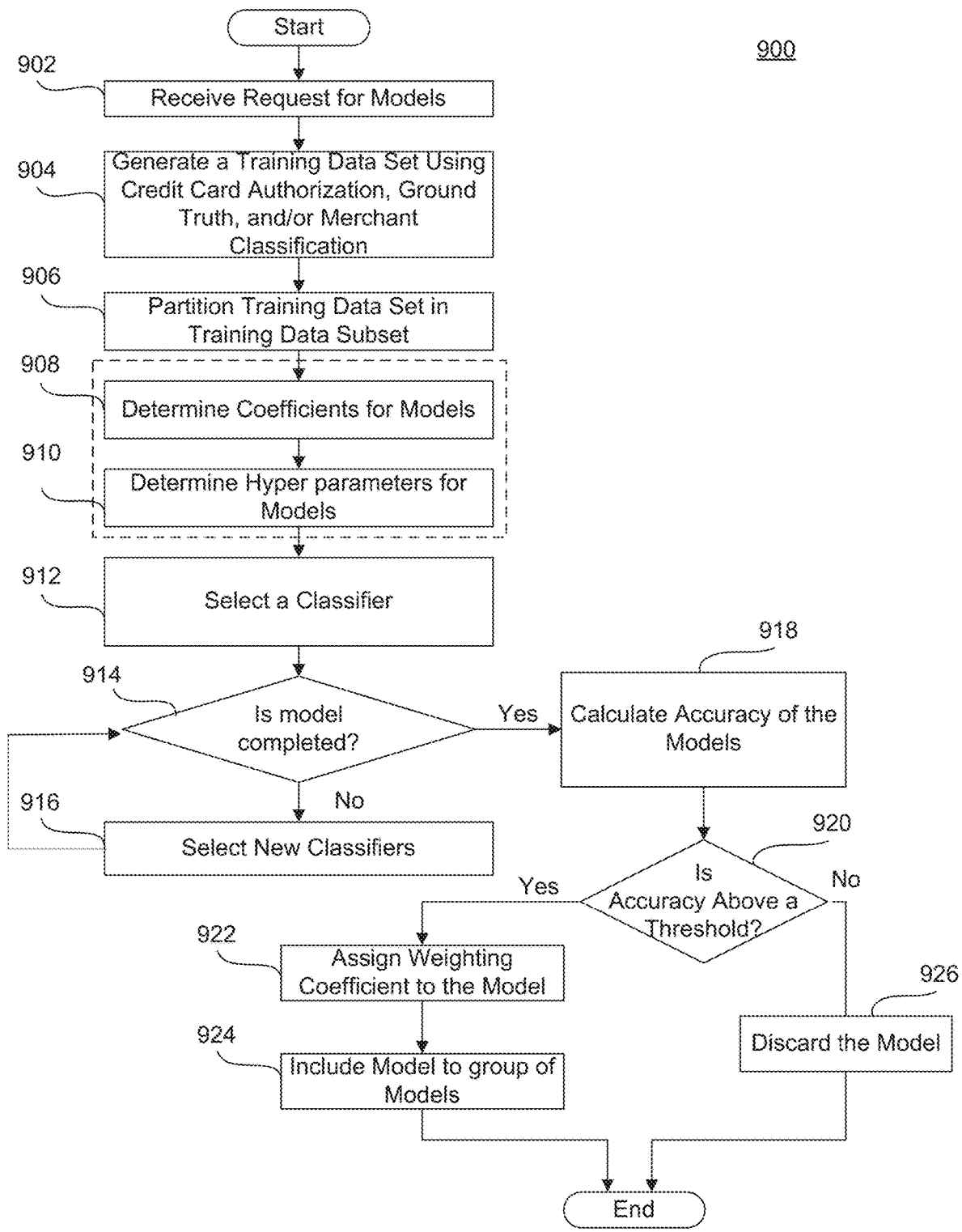
FIG. 9 is a flow chart illustrating an exemplary prediction model generation process, consistent with disclosed embodiments.

FIG. 9 is an exemplary flow chart illustrating a model generation process, consistent with disclosed embodiments. In some embodiments, model generator 120 may carry out model generator process 900.

In step 902, model generator 120 may receive a request for prediction models. In some embodiments, the request may specify a merchant, a time of the day, and/or a merchant classification. For example, prediction system 110 may send a request for prediction models. The request may include information about merchant systems 160 and/or client devices 150.

In step 904, model generator 120 may generate a training data set. Model generator 120 may generate the training data set using information from databases 180, online resources 140, and/or financial services system 130. For example, model generator 120 may retrieve, from databases 180, credit card authorizations associated with a group of merchant systems 160. Model generator 120 may also collect a ground truth data set, from the ground truth analyzer 320, associated with the same group of merchants. Training data module 330 may merge or combine these data sets to generate a training data set. In some embodiments, training data module 330 may be configured to rate the accuracy of information in the data set. For example, training data module 330 may create ground truth accuracy scores for merchant systems 160. When ground truth analyzer is highly confident of hours of operation for merchant systems 160, for example ground truth analyzer verified the determined hours of operation on a website of merchant systems 160, then training data module 330 may assign a high ground truth accuracy score. Alternatively, if ground truth analyzer 320 is not confident of hours of operation, for example hours of operation were guessed based on phone calls responded, then training data module 330 may assign a low score. Ground truth accuracy scores may enable including more merchant systems 160 in the training data set. Even if the ground truth information is not verified for a group of merchant systems 160, training data module 330 may still include those merchants and tailor the model's reliance on those samples with the ground truth accuracy score.

In some embodiments, training data module 330 may select data based on the request for a prediction model of step 902. For example, prediction system 110 may request a model from model generator 120 for a restaurant on Saturday. Training data module 330 may generate a training data set only using credit card authorization and ground truth only for restaurants on Saturdays.

In step 906, model generator 120 may create training data subsets by dividing the training data set. In some embodiments, model generator 120 may divide the training data set randomly creating random training subsets. Then, prediction models may be generated using the randomly selected subsets of the training data set. Elements in the training data subsets may be unique to each subset to create independent training data subsets. Alternatively, training data subsets may share elements and overlap. In other embodiments, model generator 120 may divide the training data set using division rules.

The training data set division rules may indicate the number of divisions and/or ratios between different groups. For example, the training data set may be divided using an 80/20 split for testing and validation data. Training data division rules may also specify the training data set should be divided in three portions. A first portion to calculate coefficients for a model, a second portion used to calculate hyper parameters associated with a model, and a third portion used to validate and calculate accuracy of the model. Division rules may be a function of the information included in the request for a prediction model. For example, if the request specifies the model is for a restaurant, model generator 120 may apply a 60/40 split for testing and validation to have stricter accuracy measurements.

Model generator 120 may generate a candidate model using a training data set. For example, model generator may process the training data set of step 906 to determine coefficients (step 908) and hyper parameters (step 910) for a prediction model. The prediction models may be parametric, non-parametric, or semi-parametric.

In some embodiments, model generator 120 may create a plurality of decision trees as prediction models. For example, model generator 120 may use a top-down or a bottom-up approach to generate candidate decision trees in steps 908 and 910. In such embodiments, model generator 120 may generate nodes by finding a discrete function of the input attributes values using a training data set or a training data subset. Based on a splitting metric, a coefficient may be assigned to the node. Decision trees created by model generator 120 may then be used in a random forest analysis.

In other embodiments, model generator 120 may generate neural networks, Group Method of Data Handling (GMDH) algorithms, Naive Bayes classifiers, and/or Multivariate Adaptive Regression Splines. For example, model generator 120 may implement Convolutional Neural Networks (CNN), generating nodes and connections associated with multiple dimensions using the training data. CNNs consist of multiple layers of receptive fields and various combinations of convolutional and fully connected layers. Additionally, model generator 120 may implement Recurrent Neural Networks (RNN), generating nodes and connections with directed cycles that dynamically adjust to behaviors of the training data.

In some embodiments, model generator 120 may generate candidate models under defined constraints. For example, in embodiments in which the generated models are decision trees, model generator 120 may be constrained to have a maximum depth of 10 node levels.

In step 914, model generator 120 may evaluate if the model is completed or if it has reached a stopping criteria. For example, when model generator 120 generates decision trees, in step 914 model generator 120 may evaluate if a stopping criteria is fulfilled for the end nodes. In some embodiments, stopping criteria may be intrinsic to the model or defined by hyper parameters. For example, the stopping criteria may be achieved when all the samples there is no further classifications or variables to further split the model. Alternatively, the stopping criteria may be defined by user imposed constrains and hyper variables.

If the stop criteria in not fulfilled, model generator 120 may continue to step 916 and select a new variables or parameters to determine new classifiers. In embodiments in which model generator 120 generates a decision tree, in step 916 model generator 120 may select a new function for splitting a subset of the training data set after the first split in the root node. If the splitting results are above a splitting ratio then model generator 120 may include a new node in the decision tree. In other embodiments, model generator 120 may continue adding nodes or modes to the model in step 916. After developing the model, model generator 120 may return to step 914 and evaluate again if the model is completed.

Alternatively, when the stop criteria is fulfilled, model generator 120 may continue to step 918, in which model generator 120 calculate the accuracy of the model using a portion of the training data set. Model generator 120 may use, for example, information gain, Gini index, likelihood-ratio chi-square statistics, Dietterich Kearns, and Mansour (DKM) splitting criterion, and/or normalized impurity based criteria to evaluate accuracy of the generated model. In some embodiments, model generator 120 may also generate a receiver operating characteristic curve to evaluate the performance of a binary classifier.

In step 920, model generator 120 may evaluate whether the accuracy for the model is above an accuracy threshold. In some embodiments, the accuracy threshold for the model may be automatically adjusted based on optimization objectives set for the prediction models. If the model is not above the threshold (step 920: No) the model may be discarded in step 926. If the calculated accuracy is above the threshold (step 920: Yes), model generator 120 may assign a weighted coefficient to the model in step 922 and include the model to the set of models in step 924. The weighted coefficient may associated with the calculated accuracy. For example, the weighted coefficient may be proportional to the accuracy.

Process 900 may be repeated a plurality of times to generate a plurality of models. In some embodiments, model generator 120 may repeat the process until a minimum of models is generated. For example, prediction system 110 may request that model generator 120 generates models for a random forest analysis. In such embodiments, model generator 120 may generate between 20-100 decision trees to conduct the prediction analysis. Less than 20 models may not provide the required accuracy while more than a 100 decision trees may demand too much computing power. In such embodiments, prediction system may require at least 50 decision trees.

FIG. 10A is an exemplary posted transaction array 1010, consistent with disclosed embodiments. Prediction system 110 may generate posted transaction array 1010 in, for example, step 618 of FIG. 6. Posted transaction array 1010 may be issued by authorization aggregator 234, and may associate time intervals 1012 with aggregated number of authorizations 1014.

Time intervals 1012 may have a start time and an end time, may be determined by prediction system 110, and may have different formats. While FIG. 10A shows independent and sequential time intervals, time intervals need not be sequential or independent. For example, time intervals may overlap, or may be non-consecutive.

Aggregated number of authorizations 1014 may indicate the total number of authorizations that were issued by a merchant during the time interval. Prediction system 110 may generate a frequency table by adding the number of credit card transactions for each time interval.

FIG. 10B is an exemplary prediction list 1020, consistent with disclosed embodiments. In some embodiments prediction list 1020 may be generated by prediction system 110, for example, at step 620. In such embodiments prediction list 1020 may be generated by prediction engine 236. Prediction list 1020 may associate time intervals 1022 with a prediction indication 1024.

Prediction time intervals 1022 may be based on transaction time interval 1012. In some embodiments, prediction time intervals 1022 may replicate transaction time intervals 1012. In other embodiments, prediction time interval 1022 may be a subset of transaction time intervals. For example, some prediction time intervals may group two or more transaction time intervals if they a have similar number of authorizations 1014 to facilitate plotting a minimizing transmission time.

Prediction list 1020 may include prediction indications 1024. In some embodiments, prediction indications 1024 may be Boolean and indicate whether the prediction model calculates the merchant to be open or closed. In other embodiments, however, prediction indication 1024 may be a category associated with the prediction probability. For example, prediction indication 1024 may assign a label such as "likely open," "likely closed," "out of business," or "24/7 open."

Prediction list 1020 may include probability values 1026. Probability indications 1026 may represent a calculated prediction probability for the merchant being open at the time intervals. Alternatively, probability indications 1026 may represent a calculated prediction probability for the merchant being closed at the time intervals. Probability indications 1026 may be based on the model results that are estimated in step 714.

Figure 11:
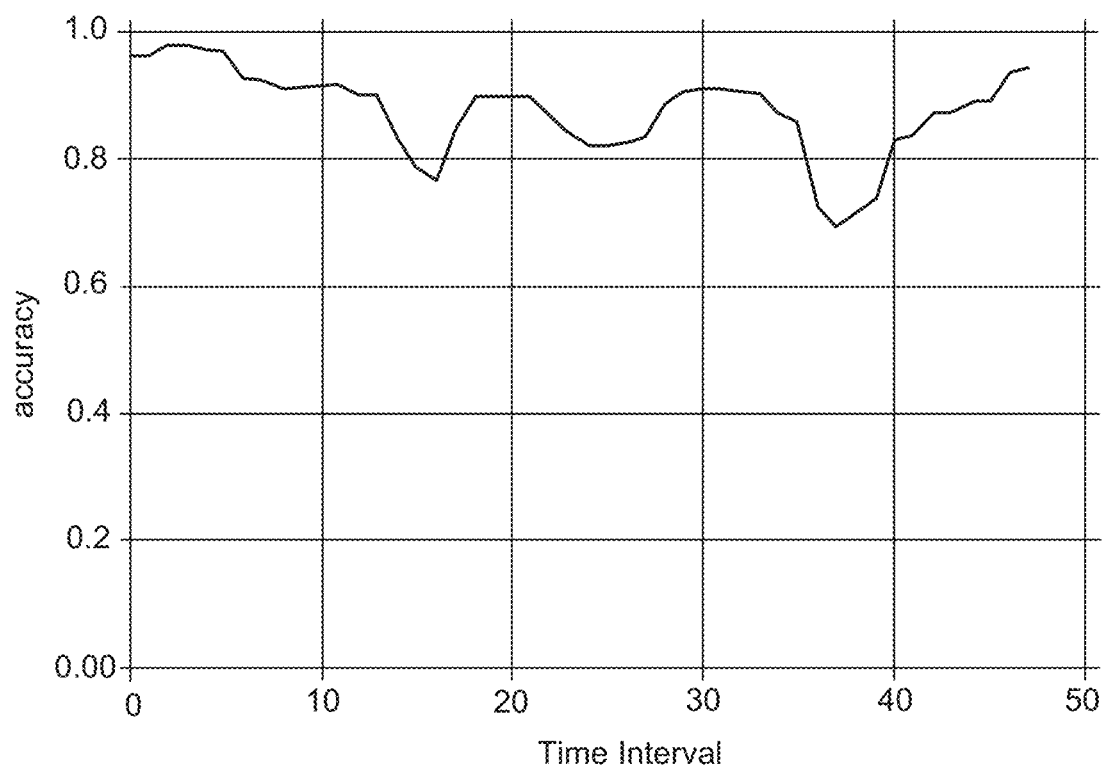
FIG. 11 is a graph of an exemplary calculation of accuracy as a function of time intervals, consistent with disclosed embodiments.

FIG. 11 is a graph of an exemplary prediction accuracy calculation as a function of a time interval, consistent with disclosed embodiments. Information presented in FIG. 11 may be generated by model generator 120 at, for example, step 918.

FIG. 11 presents a plot in which the x-axis presets a time interval, for example time intervals 1012 (FIG. 10), and the y-axis represent an accuracy estimation. The accuracy estimation may calculate accuracy of the model using a training data subset. The accuracy calculation may be performed for each one of the time intervals. In some embodiments, accuracy may represent the ratio of correct predictions to the total number of cases evaluated. In other embodiments, accuracy may represent the area under the curve of receiver operating characteristic (ROC) curve. In yet other embodiments, accuracy may represent a positive predictive value or a sensitivity for a specific criterion value or a group of criterion values. For example, accuracy may be the positive predictive value for an optimal criterion based on costs.

Figure 12:
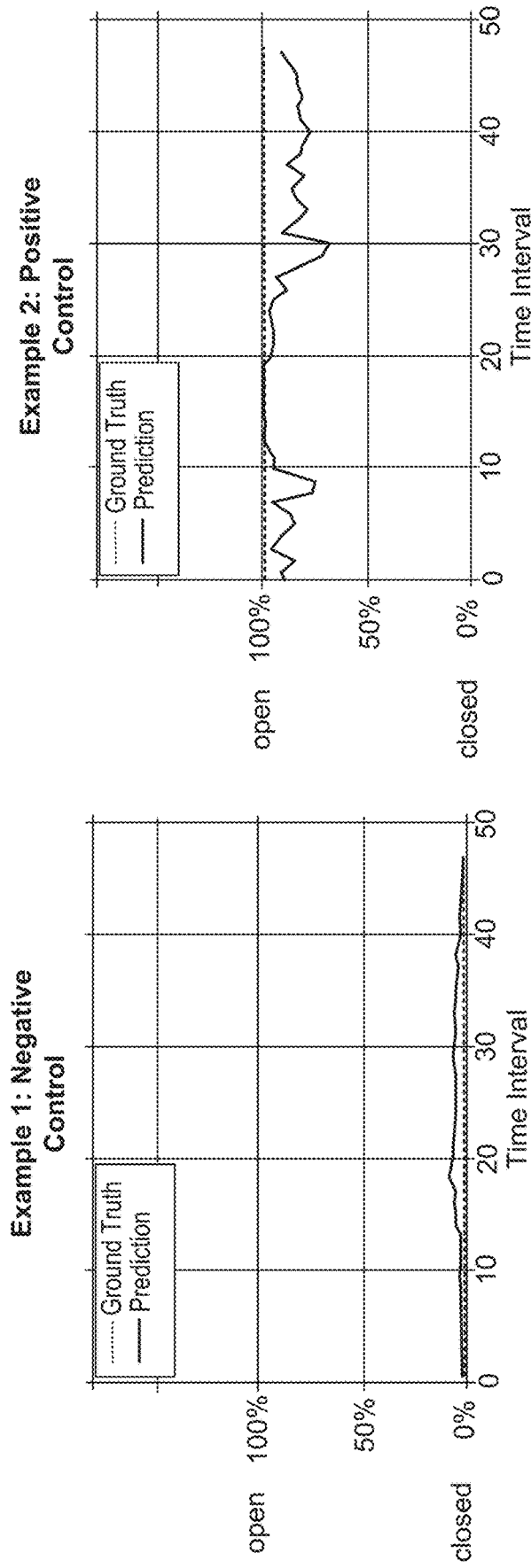
FIG. 12 is a group of graphs presenting exemplary ground truth and prediction values as a function of time intervals for control examples, consistent with disclosed embodiments.

FIG. 12 shows graphs of two exemplary comparative results, presenting a ground truth and a prediction as a function of a time interval for control merchants, according with disclosed embodiments. The comparative results are presented in plots where the X axis represents a time interval, for example time intervals 1022 (FIG. 10), and the Y axis represents a predicted probability of the merchant being open (for the prediction solid line) and the hours of operation ground truth (dotted line).

Example 1 shows results for a negative control. Merchant in Example 1 is never open. For example, the merchant in Example 1 may be a closed business. Therefore the ground truth plot shows that the merchant is always closed. In Example 1, the prediction, calculated by prediction system 110 using credit card authorization data, is always low. In Example 1, because the merchant is closed, the merchant does not issue any credit card authorizations. Therefore prediction system 110 generates a prediction list with low probabilities for all time intervals.

Example 2 shows results for a positive control. The merchant in example 2 is always open. For example, the merchant in Example 1 is an online business that does not close and continuously receives orders and issues credit card authorizations. Therefore the ground truth plot shows that the merchant is always open. In Example 1, the prediction is always high. In Example 2, the merchant constantly receives orders and issues credit card authorizations. Therefore, prediction system 110 generates a prediction list with high probabilities for all time intervals.

Figure 13:
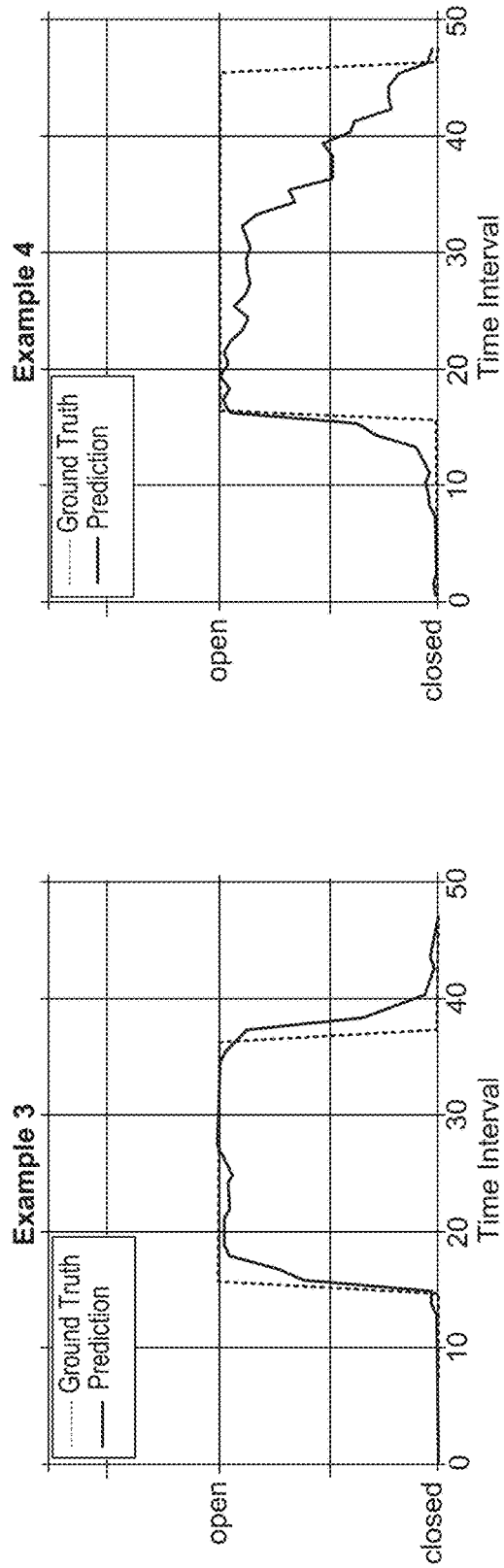
FIG. 13 is a group of graphs presenting exemplary ground truth and prediction values as a function of time intervals for testing examples, consistent with disclosed embodiments.
Figure 13:
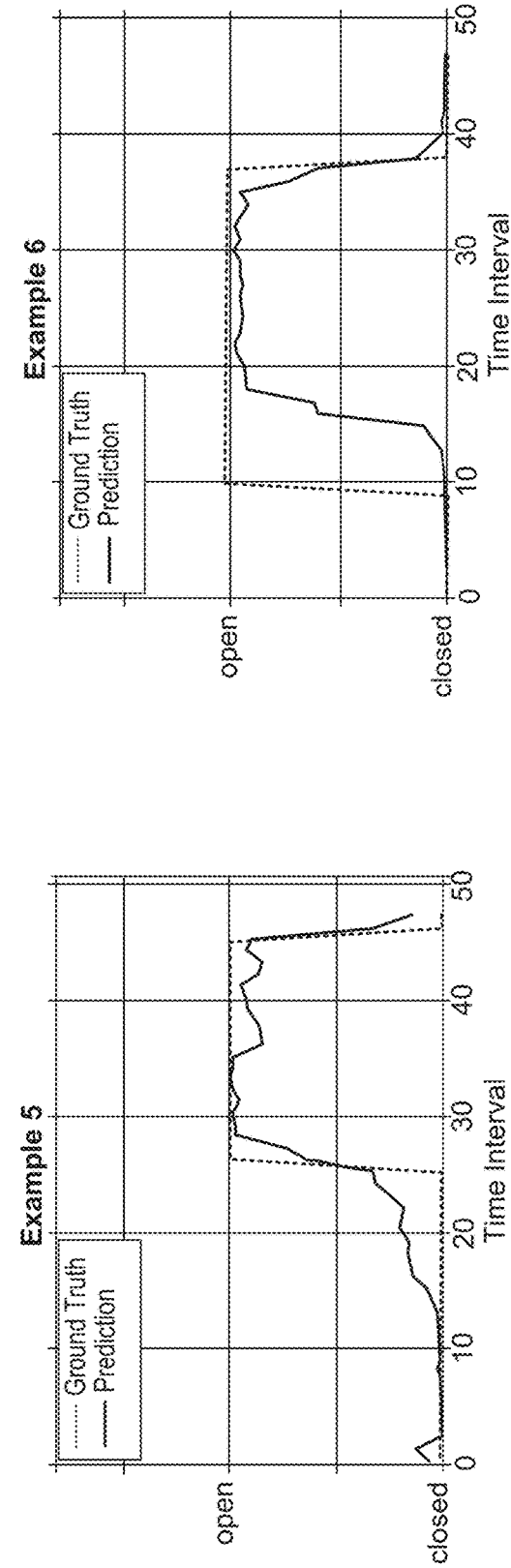

FIG. 13 shows graphs of exemplary comparative results presenting a ground truth and a prediction as a function of a time interval for testing merchants, according with disclosed embodiments. FIG. 13 presents plots similar to the ones in FIG. 12 with the same coordinate axes. Examples 3-6 show predicted and ground truth hours of operation for four different merchants.

Merchants of Examples 3-6 open and close within a day. The dotted line represents the ground truth of hours of operation while the solid line represent the prediction probability of the merchant being open or closed. Examples in FIG. 13 show that the prediction generally follows the hours of operation for each merchant. The prediction is low with the merchant is closed while the prediction is high when the merchant is open.

In some embodiments the prediction can be further classified in a binary state. For example in some embodiments, prediction system 110 may determine any prediction probability above 50% is open while any prediction below 50% is closed. In other embodiments prediction system 110 may classify in different states. For example prediction probabilities below 25% may have a status of "closed", prediction probabilities between 25-50% may have a status of "likely closed," prediction probabilities between 50-75% may have a status of "likely open," and prediction probabilities between 75-100% may have a status of "open."

Figure 14:
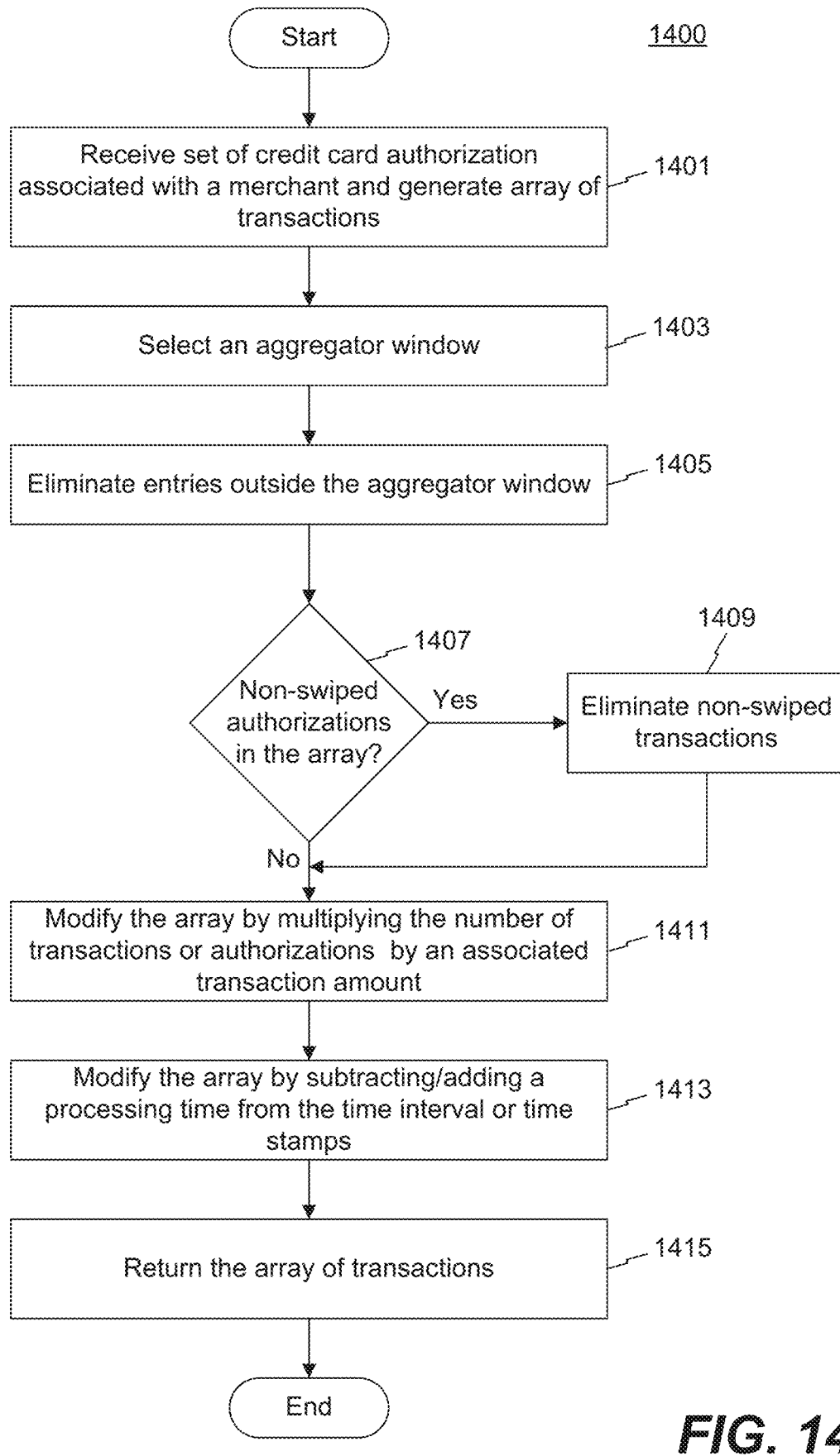
FIG. 14 is a flow chart illustrating an exemplary modified posted transaction array generation process, consistent with disclosed embodiments.

FIG. 14 is an exemplary flow chart illustrating a modified posted transaction array generation process, according with disclosed embodiments. In some embodiments, process 1400 may be executed by model generator 120. However, in other embodiments process 1400 may be executed by prediction system 110.

Model generator 120 may receive a group of credit card authorizations associated with a merchant in step 1401. For example, model generator 120 may receive credit card authorizations from merchant systems 160, financial services system 130, and/or online resources 140. In some embodiments, model generator 120 may generate arrays of transactions as discussed in connection with FIGS. 6 and 10. In such embodiments, model generator 120 may aggregate transactions in an array that associates dates with number of transactions. The array may additionally associate a specific time interval with number of transactions. In other embodiments, alternative composite data structures (such as tagged unions or strings) may also store credit card authorization information.

In step 1403, model generator 120 may select an aggregator window. Merchant popularity may be highly seasonal. For example, a merchant that is popular during the summer may not be popular during winter. Also, a new bar is popular for a couple months but then is no longer busy. To have accurate predictions model generator 120 may reduce the sample of credit card authorizations for a particular merchant using the aggregator window. The aggregator window may specify an initial date and final date. Model generator 120 may determine the initial and final dates based on the type of merchant associated with the credit card authorization. For instance, if the merchant is associated with a theme park, model generator 120 may select a short window of only a couple months. However, if the merchant is associated with an airport restaurant, model generator 120 may select an aggregator window of a full year. In other embodiments, model generator 120 may select an aggregator window based on the periodicity of the number of credit card transactions or authorizations.

In step 1405, model generator 120 may eliminate entries outside the aggregator window to limit the sample set that will be used to make the popular or busy hours prediction.

In step 1407, model generator may determine if transactions in the set of credit card authorizations were proximity transactions, that is transactions in which the credit card was in close proximity to the POS terminal, for example, NFC, chip-read, or swiped transactions. For security reasons, like preventing unauthorized use, credit card authorization information may include metadata of how the transaction was initiated. For example, credit card authorization metadata may include information of whether the card was swiped in a payment terminal. This feature becomes relevant for hours of operation and popular hours prediction because only credit card authorizations that are swiped are relevant for the predictions. For example, a restaurant may offer take out services with phone or online purchases. Customers using the take out service do not crowd the restaurant and, thus, their credit card authorizations are irrelevant for the predictions. Indeed, these non-swiped transactions may adversely affect the prediction resulting in a higher occupancy prediction. Therefore, in step 1407 model generator 120 may review metadata associated with credit card authorizations and categorize authorizations as non-swiped (i.e., online or telephone purchase). When model generator 120 determines the credit card transactions include non-swiped transactions (step 1407: yes), model generator 120 may continue to step 1409 and eliminate the non-swiped transactions. However, if model generator 120 determines the credit card transactions does not include non-swiped transactions (step 1407: no), model generator 120 may continue to step 1411.

In step 1411, model generator 120 may modify the transactions array by multiplying the number of transactions by an associated transaction amount. For many merchants there is not a direct correlation between the number of transactions and the number of customers at the merchant. For example, in restaurants a single transaction may be issued for a large table with multiple customers. Thus, even though there is a single issued transaction the restaurant may be busy. However, there may be a correlation between the amount spent in the merchant and the number of customers. For example, the bill in a table of twenty people is larger than the bill in a table for one person. To improve accuracy of the popular hours prediction, model generator 120 may modify a transaction or credit card authorization array so it does not merely reflect the number of transactions, but it also considers the amount of each transaction. In this way model generator 120 may solve inconsistencies in which a single transaction represents multiple customers. Therefore, in step 1411 model generator 120 may modify the array by multiplying the number of transaction by a transaction amount. In such embodiments, a single transaction that has a large associated amount will represent a greater number of customers in the prediction. In some embodiments, the multiplication of step 1411 may be modified based on the merchant type. For example, in a restaurant the multiplication may include a factor of an average meal cost to attempt assessing the number of customers associated with a transaction. Also, in a fast food restaurant, the multiplication number may be factored by the time between transactions to estimate waiting periods even if the transactions amount are similar.

In step 1413, model generator 120 may modify the array by subtracting a processing time from the time interval. For many merchants, customers may pay at the end of service or at the beginning of service. Therefore, there is not a simple correlation between the popular or busy hours and the time when the credit card transaction is issued. For example, in a restaurant costumers may pay at the end of the meal. Thus, a transaction that is issued at 2 pm may be associated with a customer using the restaurant at 1 pm. Alternatively, in a coffee shop a customer pays when he arrives, but uses the coffee shop later. Thus, in a coffee shop a transaction issued at 3 pm may reflect the customer being in the coffee shop from 3 pm-4 pm. To minimize popular hours prediction errors, in step 1413 model generator 120 may subtract or add a time to the time stamp of the transactions in the transaction array. In some embodiments, the added or subtracted time may be uniformly selected for an specific type of merchant. For example, all merchants classified as restaurants will be subtracted 30 min or all merchants classified as coffee shops will be added 15 min. However, in other embodiments, the subtracted time may be a function hour of the day, predicted hours of operation, or the number of transactions recorded for a period of time. For example, in transactions associated with a coffee shop, the added time may be small for morning hours but longer for evening hours. Alternatively, if model generator 120 determines multiple transactions in a single hour, the subtracted time may be greater to account for possible delays during busy hours. Therefore, the added or subtracted time of step 1413 may be a function of the number of transactions in a time interval.

In step 1415, model generator 120 may transmit the array of transactions to a different element of system 100 for further processing. For example, model generator 120 may send the array of transactions to databases 180 or prediction system 110 to be available for generate, for example, graphical user interfaces.

Figure 15:
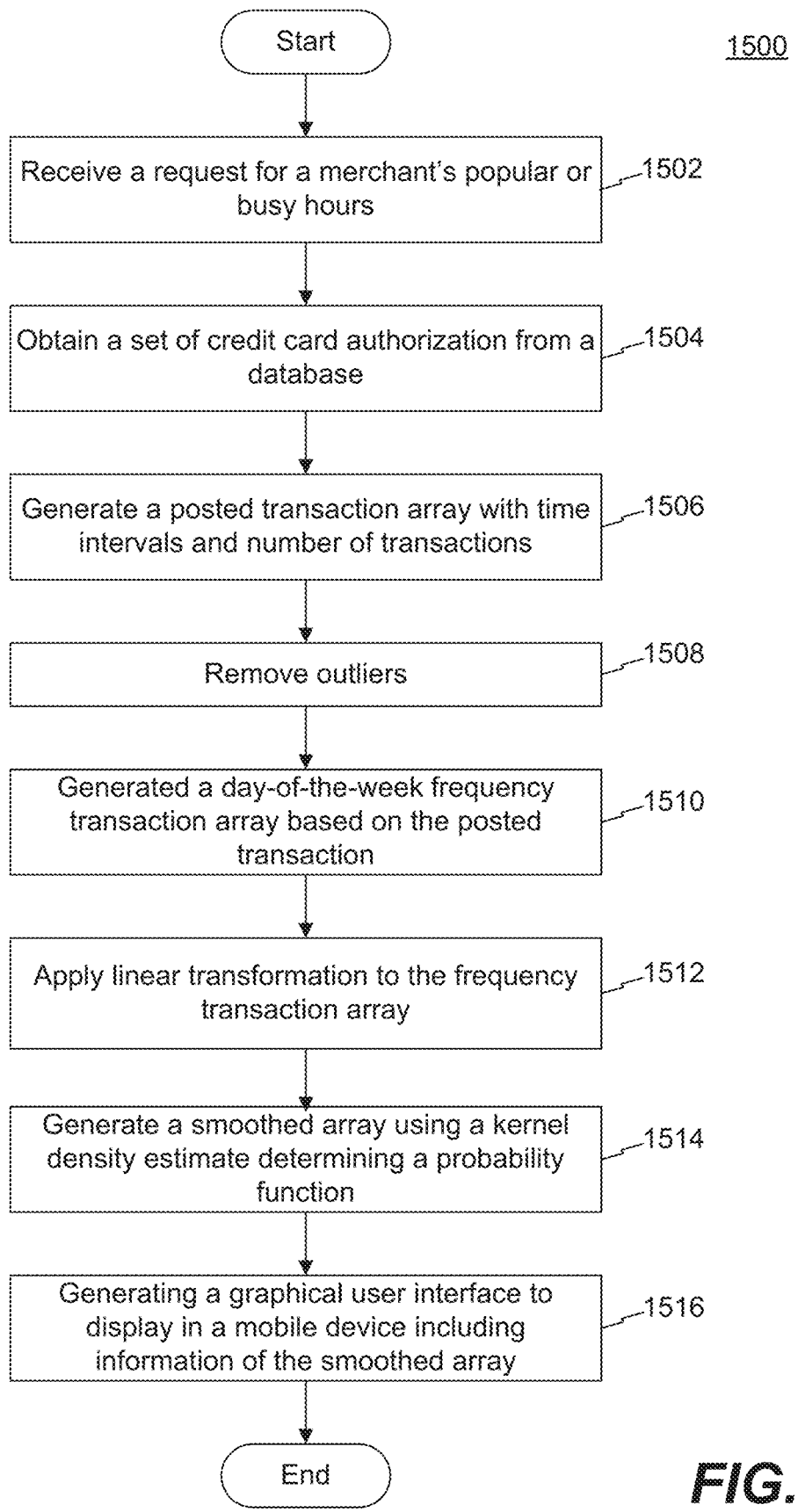
FIG. 15 is a flow chart illustrating an exemplary popular hours request process, according with disclosed embodiments.

FIG. 15 is an exemplary flow chart illustrating a popular hours request processing, according with disclosed embodiments. In some embodiments, process 1500 may be executed by prediction system 110. However, in other embodiments, process 1500 may be processed by other elements of system 100.

Prediction system 110 may receive a request for a merchant's popular or busy hours in step 1502. For example, in some embodiments prediction system 110 may receive a request from client devices 150. The request may specify a merchant. Alternatively, the request may include information location of client devices 150 and a type of merchant. For example, the request may include a merchant type, such as coffee shop, and a general area, such as a postal code. Prediction system 110 may then determine a specific merchant based on that information and associate the merchant to the request.

Based on the request received in step 1502, prediction system 110 may obtain a set of credit card authorizations from databases 180 in step 1504. The credit card authorizations retrieved from databases 180 may be associated with the specific merchant. For example, if the request includes "Restaurant X" and "123 Main St," then prediction system 110 may retrieve credit card authorization data associated with the specific "Restaurant X" in "123 Main St." In some embodiments, prediction system 110 may determine that there is not enough transactions for the specific merchant and craft a prediction based on similar merchants. For example, in some embodiments prediction system 110 may retrieve information of restaurants within a radius from "Restaurant X" in "123 Main St." The radius used by prediction system 110 may be a function of the number of transactions available for the specified merchant. For example, if the specified merchant has a small number of transactions, then the radius may be large (i.e., one mile) to collect credit card transactions associated with multiple merchants. However, if the specified merchant has a large number of associated transactions, the radius for aggregating transactions of similar merchants may be small (i.e., one tenth of a mile).

In step 1506, prediction system 110 may generate a posted transaction array including time intervals and a number of transactions. A similar process has been described in connection to step 618 of FIG. 6. In some embodiments, however, prediction system 110 may create a posted transaction array tailored for popular hours prediction in step 1506. For example, the posted transaction array generated in step 1506 may have longer time intervals. Moreover, as explained in connection to FIG. 14, the posted transaction array generated in step 1506 may be modified to improve accuracy of the popular hours prediction. For example, the posted transaction array generated in step 1506 may be filtered out of non-swiped transaction, may have a number of transactions that is modified by an operation with a transaction amount, and may include time stamps that are modified by a subtraction/addition of time.

Prediction system 110 may remove outliers in step 1508. Outlier data may decrease the prediction accuracy by modifying the average of transactions for a day of the week in which there is an abnormally high or low number of transactions. For example, in Thanksgiving there may be a very low number of transactions in a coffee shop or a restaurant. This low number of transactions may skew the average number of transactions for Thursdays and incorrectly result in a prediction of Thursday being an unpopular day. To prevent poor predictions, in some embodiments prediction system 110 may remove outliers. Prediction system 110 may eliminate outliers by counting the number of transactions associated with a unique date and remove dates that do not meet a minimum number of transactions. For example, prediction system 110 may eliminate any date that has less than a predetermined number of transaction (e.g., a minimum of three transaction). Alternatively, prediction system 110 may eliminate days based on a deviation from the mean of number of transactions. For instance, prediction system 110 may eliminate Thursdays in which the number of transaction deviate more than three times the standard deviation ($3\sigma$) from the mean of the average number of transactions on Thursday. Alternatively or additionally, prediction system 110 may employ other techniques or combination of techniques to remove outliers. For instance, prediction system 110 may use at least one of Z-Score or Extreme Value Analysis (parametric), Probabilistic and Statistical Modeling (parametric), Linear Regression Models (PCA, LMS), Proximity Based Models (non-parametric), Information Theory Models, and/or High Dimensional Outlier Detection Methods (high dimensional sparse data), to remove outliers.

After removing outliers, prediction system 110 may down-sample other days have a uniform number of samples for each day of the week and facilitate analysis. For example, after removing outlier dates Friday may have only 100 sample date while the other days of the week have 200-300 samples. To facilitate data analysis and prevent over or under representation, prediction system 110 may down-sample other days of the week so each day has 100 samples. In such embodiments, prediction system 110 may randomly select the extra dates to be eliminated. Alternatively, prediction system 110 may select dates with lower number of transactions for elimination.

An exemplary subroutine that prediction system 110 may perform in step 1508 is:

```
def sample_trxns_popular_hours(data, datetime_col-
    umn):
    # count n_trxn by date, add weekday column
    date_counts=pd.DataFrame(data[datetime_column].dt-
        .date.value_counts( ), columns=['count'])
    date_counts[weekday]=date_counts.index.to_datetime(
        ).weekday
    # remove outlier dates (z_score(n_trxn)<3)
    z_scores=preprocessing.scale(date_counts['count'])
    dates=date_counts[abs(z_scores)<3]
    # count number of dates per weekday, take min for
        down-sampling
    weekday_counts=dates['weekday'].value_counts( )
    min_count_weekday=min(weekday_counts)
    # randomly downsample dates to min value so weekdays
        get equal sampling grouped=dates.groupby('week-
        day')
    idx=np.concatenate([random.sample(grouped.indices[x],
        min_count_weekday) for x in grouped.indices])
    dates_selected=dates.iloc[idx].index
    # return selected trxns
    return data[data[datetime_column].dt.date.isin(dates_se-
        lected)]
```

In step 1510, prediction system 110 may generate a day-of-the-week frequency transaction array based on the posted transaction array. Prediction system 110 may select a time interval and generate a frequency transaction array for each day with the selected time interval. For example, prediction system 110 may generate an array that associates days of the week (Monday-Sunday), with a time period (every hour between 9 am to 5 pm), and a number of transactions. In some embodiments instead of the raw number of transaction the frequency transaction array may associated days of the week and time periods with modified number of transaction as described in FIG. 14.

Prediction system 110 may generate the array as a two dimensional matrix where one dimension is day of the week and the second dimension is time interval or time period. Elements in the two dimensional matrix may be addressed with coordinates like {Monday, 10 am-11 am}. However, in other embodiments, prediction system 110 may simply generate a one dimensional array that specifies in a single dimension day and time interval {"Monday from 10 am-11 am}.

In step 1512, prediction system 110 may apply a linear transformation to the frequency array to normalize data. To facilitate data manipulation, prediction system 110 may modify the frequency transaction array to, for example, generate values within [0:1]. For example, in step 1512 prediction system 110 may apply a minmax transformation to the number of transactions. For example, prediction system 110 may perform the following transformation to the number of transactions or the modified number of transactions to create normalized values based on a maximum entry and a base:

base=min(trr)
range=max(trr)−base
normalized=[(x-base)/range for x in trr] Moreover, pre-
diction system 110 may Prediction system 110 may also apply other normalization operations to the frequency transaction array. For example, prediction system 110 may normalize data applying variable transformations to normalize the number of transactions or modified number of transactions (i.e., transactions multiplied by an amount) by stripping the rightmost trailing zeros and converting any result equal to Decimal('0') to Decimal ('0e0'). For instance, Decimal('32.100') and Decimal ('0.321000e+2') both normalize to the equivalent value Decimal('32.1'). Alternatively, prediction system 110 may use normalization based on mean and standard deviation. For instance, prediction system 110 may perform the following operations:

```
# prepare data for standardization
values=series.values
values=values.reshape((len(values), 1))
# train the standardization
scaler=StandardScaler( )
scaler=scaler.fit(values)
print('Mean: % f, StandardDeviation: % f' % (scaler-
    .mean_, sqrt(scalervar_)))
# standardization the dataset and print the first 5 rows
normalized=scaler.transform(values)
for i in range(5):
print(normalized[i])
# inverse transform and print the first 5 rows
inversed=scaler.inverse_transform(normalized)
for i in range(5):
print(inversed[i])
```

Prediction system 110 may additionally generate a smoothed array to minimize noise in the sample of credit card authorizations or transactions. Thus, prediction system may apply a kernel density estimate to determine a probability function based on the frequency transaction array in step 1514. For example, prediction system 110 may apply a Gaussian kernel density estimation (KDE) with a predetermined bandwidth selection to generate a smoother array. In other embodiments, however, prediction system 110 may generate the smoothed array applying a Epanechnikov KDE to optimize the mean square error. In such embodiments, the Epanechnikov KDE may be selected with a bandwidth of 2.

In some embodiments, prediction system 110 may perform the following subroutines to perform steps 1510-1514:

```
def popular_hours(trxns, n_trxn_thresh=0):
    'Calculate popular hours merchant feature from list of
        transactions
    # calculate hour of week for all trxns
    vals=[x.local_timestamp.weekday( )*24.+
    x.local_timestamp.hour+
    x.local_timestamp.minute/60.+
    x.local_timestamp.second/3600.
    for x in trxns if x.local_timestamp]
    # return None if insufficient data
    if len(vals)<=n_trxn_thresh:
    return None
    # calculate pdf using kernel density estimation
    kde=KernelDensity(kernel='epanechnikov',      band-
        width=2.0).fit(vals)
    # integrate pdf for every hour of the week
    probs=[quad(lambda x: np.exp(kde.score(x)), i, i+1)[0]
        for i in range(7*24)]
    # renormalize scores to be in range [0,1]
    scores=probs/np.max(probs)
    return scores
```

In step 1516, prediction system 110 may respond to the request received in step 1502 by generating a graphical user interface. For example, when the request is received from client devices 150, prediction system 110 may generate a graphical user interface with information of the smoothed array. The graphical user interface may have an specific arrangement and specific functions as further described in connection with FIGS. 19-20.

Figure 16:
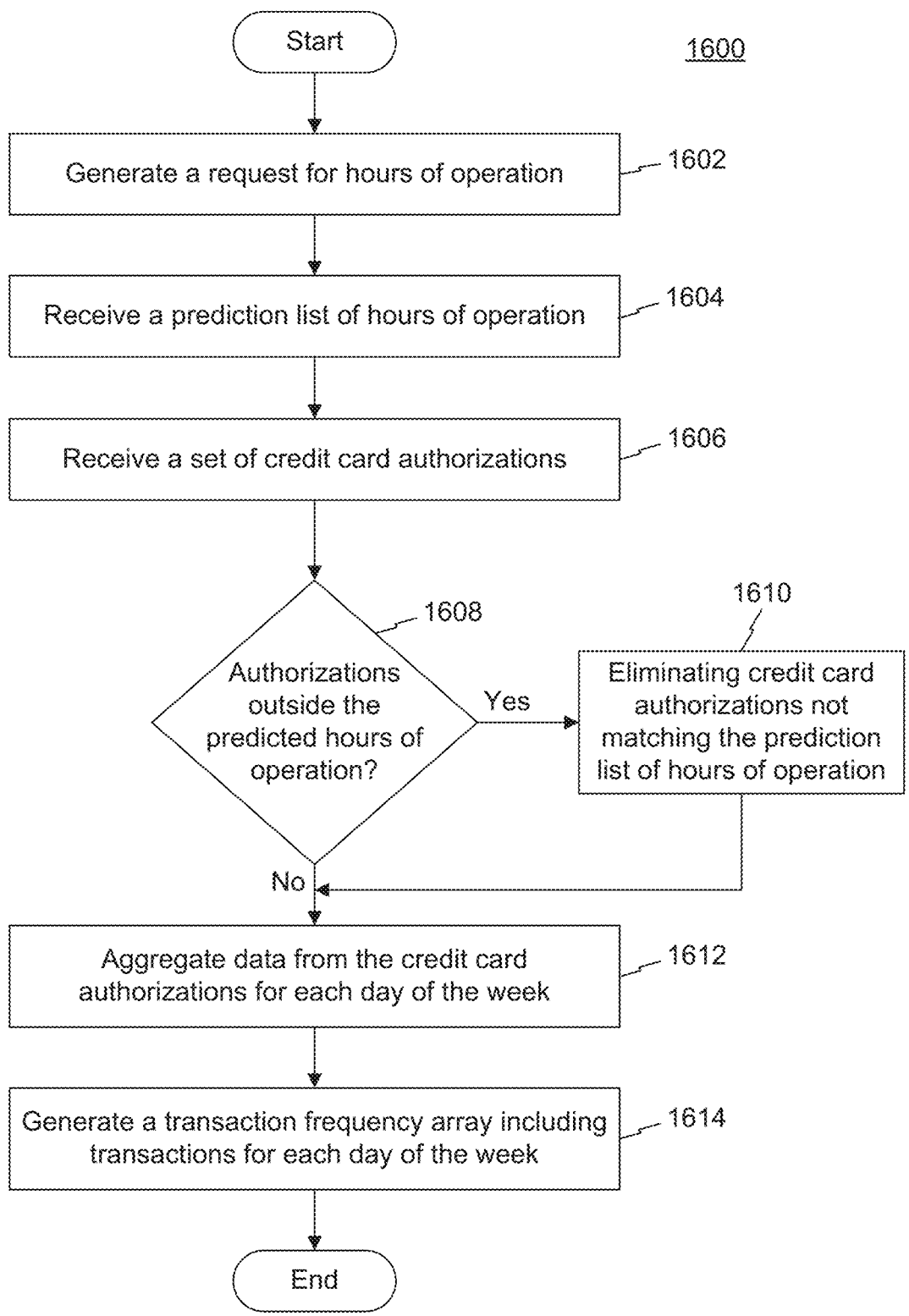
FIG. 16 is a flow chart illustrating an exemplary transaction frequency array generation process, consistent with disclosed embodiments.

FIG. 16 is an exemplary flow chart illustrating a transaction frequency array generation process, according with disclosed embodiments. Process 1600 may be performed by prediction system 110. However, in other embodiments, process 1600 may be performed by other components of system 100.

In some embodiments, to effectively generate a prediction of popular or busy hours it is important to quickly filter credit card authorization data to minimize use of computational resources and promptly respond to a client request. Methods previously disclosed for modifying posted transaction arrays and filtering data may serve this purpose. However, additional filtering processes may be possible by combining the prediction of hours of operation described in connection to, for example, FIG. 6 and the prediction of a merchant's busy hours. In this way, prediction system 110 may quickly discard transactions that are not relevant to the prediction of popular hours based on the prediction of hours of operation.

In some embodiments, the hours of operation prediction may be utilized to eliminate transactions that are not swiped. For example, in some systems metadata of swiped or not-swiped authorizations may not be available to prediction system 110. Then, the prediction of hours of operation may be used to identify non-swiped authorizations. Under the assumption that transactions outside of hours of operation are not swiped, if prediction system 110 is uncertain of which authorizations are swiped or not swiped, prediction system 110 may guide this elimination process with the predicted hours of operation. Thus, to improve the performance of the prediction of popular or busy hours, prediction system 110 may perform process 1600 to create a more accurate data set.

In step 1602, prediction system 110 may generate hours of operation prediction for a merchant. For example, prediction system 110 may request model generator 120 to generate a model for hours of operation using process 900. Prediction system 110 may then generate the hours of operation list as described in FIG. 6 or it may also receive the prediction list of hours of operation from a different element of system 100. For example, the prediction list of hours of operation may be transmitted from model generator 120 or may have been stored in databases 180.

In some embodiments, the prediction list may have similar elements to the arrays described in connection to FIG. 10B. The prediction list of hours of operation may be for a merchant category or a specific merchant. For instance, the prediction list of hours of operation may correspond to a specific merchant such as "Restaurant X" in "123 Main St." Alternatively, the prediction list of hours of operation may be for a merchant category such as a coffee shop brand, or a chain of restaurants.

In step 1606, prediction system 110 may receive credit card authorizations. These credit card authorizations may be different from credit card authorizations that are used to generate the model and create the prediction list in processes 600 and/or 900. Using independent groups of transactions may improve accuracy of the model because it may prevent biases in the data sets that undermine accuracy. However, in other embodiments the transactions may be the same. The credit card authorizations received in step 1606 may be for a specific merchant from which a user wants to obtain estimated popular hours.

Prediction system 110 may perform a filtering process in step 1608 by determining whether there are authorizations outside the predicted hours of operation in the received set of credit card authorizations. For example, prediction system 110 may categorize transactions according to time stamps and determine if any transactions are outside the prediction hours of operation received in step 1604. When there are credit card authorizations or transaction outside the predicted hours of operation (step 1608: yes), prediction system 110 may continue to step 1610 and eliminate credit card authorizations not matching the prediction list of hours of operation. However, when there are not any credit card authorizations outside the predicted hours of operation (step 1608: no), prediction system 110 may continue to step 1612 and perform tasks to aggregate data from the credit card authorizations for each day of the week and then generate a transaction frequency array including transactions for each day of the week with only credit card authorizations that were issued during the predicted hours of operation.

Figure 17:
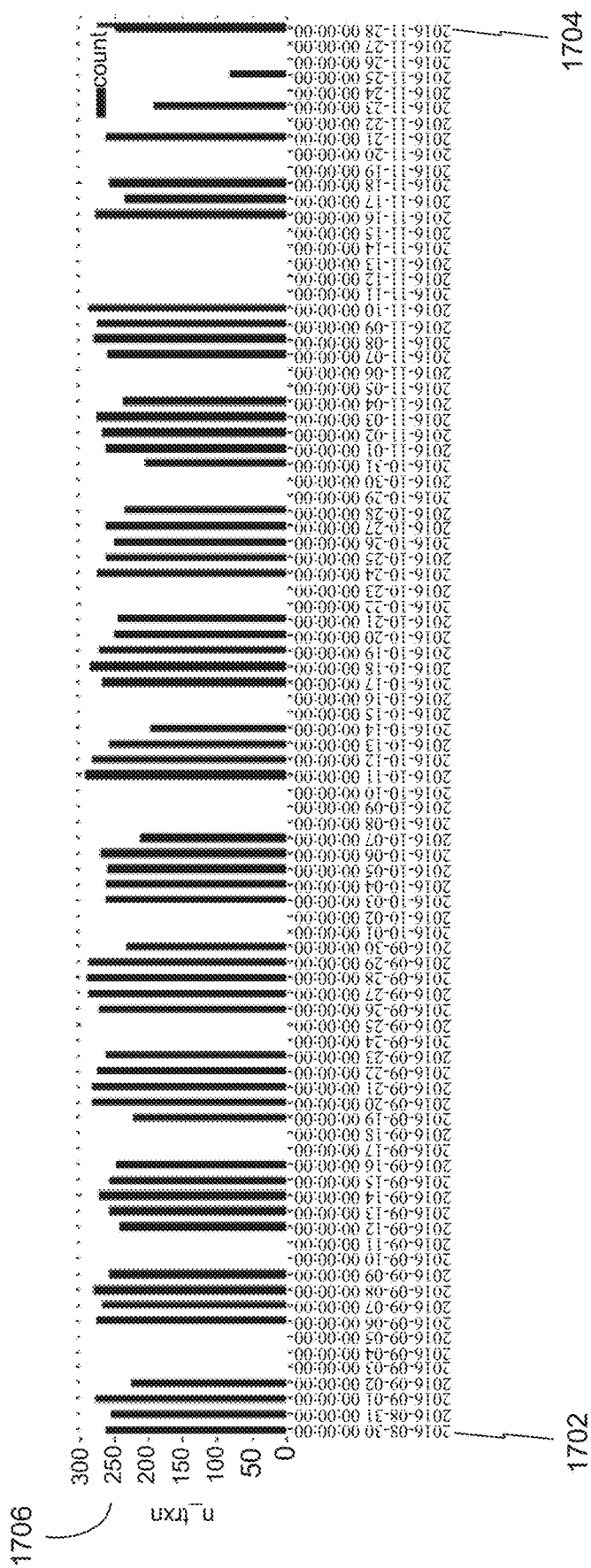
FIG. 17 is an exemplary aggregator window displaying numbers of transactions, consistent with disclosed embodiments.

FIG. 17 is an exemplary aggregator window for number of transactions, consistent with disclosed embodiments. The aggregator window may include an initial date 1702, a final date 1704, and a number of transactions 1706 associated with each date between initial date 1702 and final date 1704. Any transaction that is outside the aggregator window may be eliminated during data processing by at least one of prediction system 110, model generator 120, and/or other elements of system 100.

In certain embodiments, final date 1704 may be a current day and initial date 1702 may be a predetermined number of days before the current day. For example, initial date 1702 may be 90 days before the current day.

In other embodiments, the selection of initial date 1702 and final date 1704 may be guided on the periodicity of number of transaction 1706. For instance, in some embodiments a processor in system 100 may perform a Discrete Fourier Transform (DFT) using the dates as a time variable and number of transaction 1706 as the amplitude. In such embodiments, a process may look for a peak frequency and match the initial date 1702 and final date 1704 so they are equal to one period of number of transactions 1706. In this way, the aggregator window may be optimized to captures the different variations in the number of transactions that may occur during a period without overanalyzing data that presents repetitive information.

Other techniques to assess the periodicity of the number of transactions may be also performed to select the aggregation window. For example, a processor may implement autocorrelation algorithms to determine a period of the signal. Additionally or alternatively, a processor may implement Spectral Pattern Matching and/or Cepstrum techniques to identify a periodicity of the number of transactions and select the amplitude of the window based on the determined periodicity.

Figure 18:
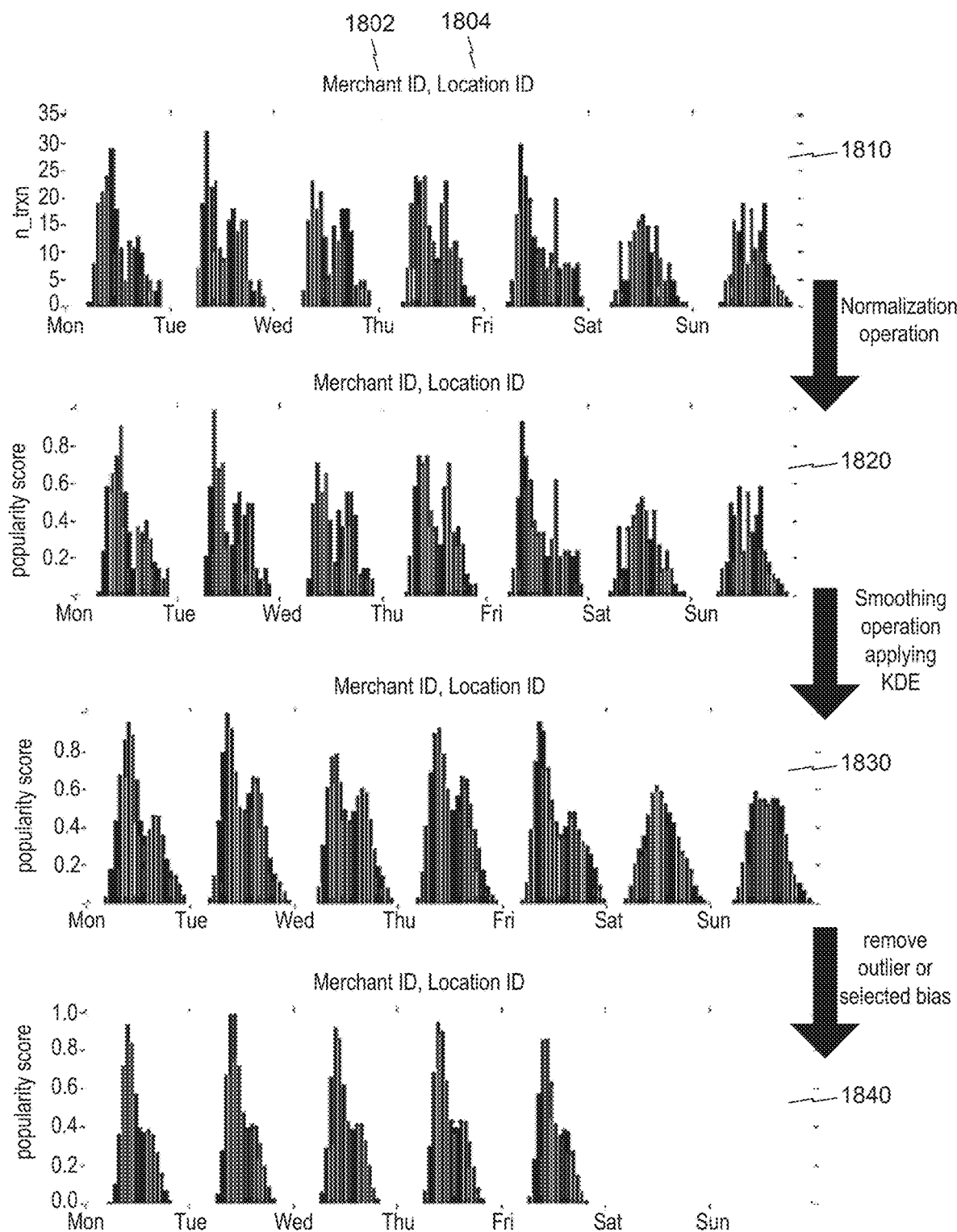
FIG. 18 is a graphic representation of an exemplary data processing flow for displaying aggregated numbers of transactions, according to disclosed embodiments.

FIG. 18 is a graphic representation of an exemplary data processing flow for aggregated number of transactions, according to disclosed embodiments. FIG. 18 describes graphically different data processing steps that are required to generate histograms of popular or busy hours.

FIG. 18 shows groups of number of transactions for each day of the week. Each day of the week is further divided in time slots. For example, each day of the week is divided in 24 hours. As shown in the graphic representation, for every hour there is an aggregated number of transactions. For example, in some embodiments "Monday between 10 am and 11 am" may be associated with number of transactions "30" because in the course of an aggregation window there were 30 transactions between 10 am and 11 am on Mondays. Moreover, the group of aggregated transactions by day and time of the day may be associated with a specific merchant with at least information about merchant ID 1802 and location ID 1804. The initial representation 1810 presents exemplary raw data of an aggregation. Similar information may be stored in transaction frequency arrays, which describe the number of aggregated transaction in a day of the week at a given time interval.

The data in initial representation 1810 may be normalized to generate a normalized representation 1820. For example, as described in FIG. 18 the number of transactions may be normalized so values are within the interval of 0 to 1. This normalization process may be performed with a minmax linear transformation and may facilitate later data processing by parametrizing the credit card authorization information.

The normalized representation may be processed to generate smooth representation 1830 by applying a KDE that outputs a probability density function based on the normalized number of transactions. The smoothing process may facilitate prediction by removing noise from the measurements. For example, in some embodiments, a normal distribution is expected from the number of transaction in the different days. Thus, a strategy to minimize noise is to apply a KDE that modifies the data to better resemble a normal distribution and minimize noise. Smooth representation 1830 represents data after it has been filtered using a KDE. Similar information may be in, for example, the smoothed array generated in step 1514.

Smooth representation 1830 may then be further processed to remove outliers and/or undesired data points to generate a finalized representation 1840. Removing outliers minimize errors prediction by discarding data points that include abnormal conditions, such as Thanksgiving. Also, finalized representation 1840 may eliminate undesired data. For instance, in some scenarios the request for popular hours may be limited for days of the week. Unnecessary information from weekends may be eliminated in the finalized representation 1840 to facilitate displaying graphical user interfaces and minimize payload of data transmissions.

Figure 19:
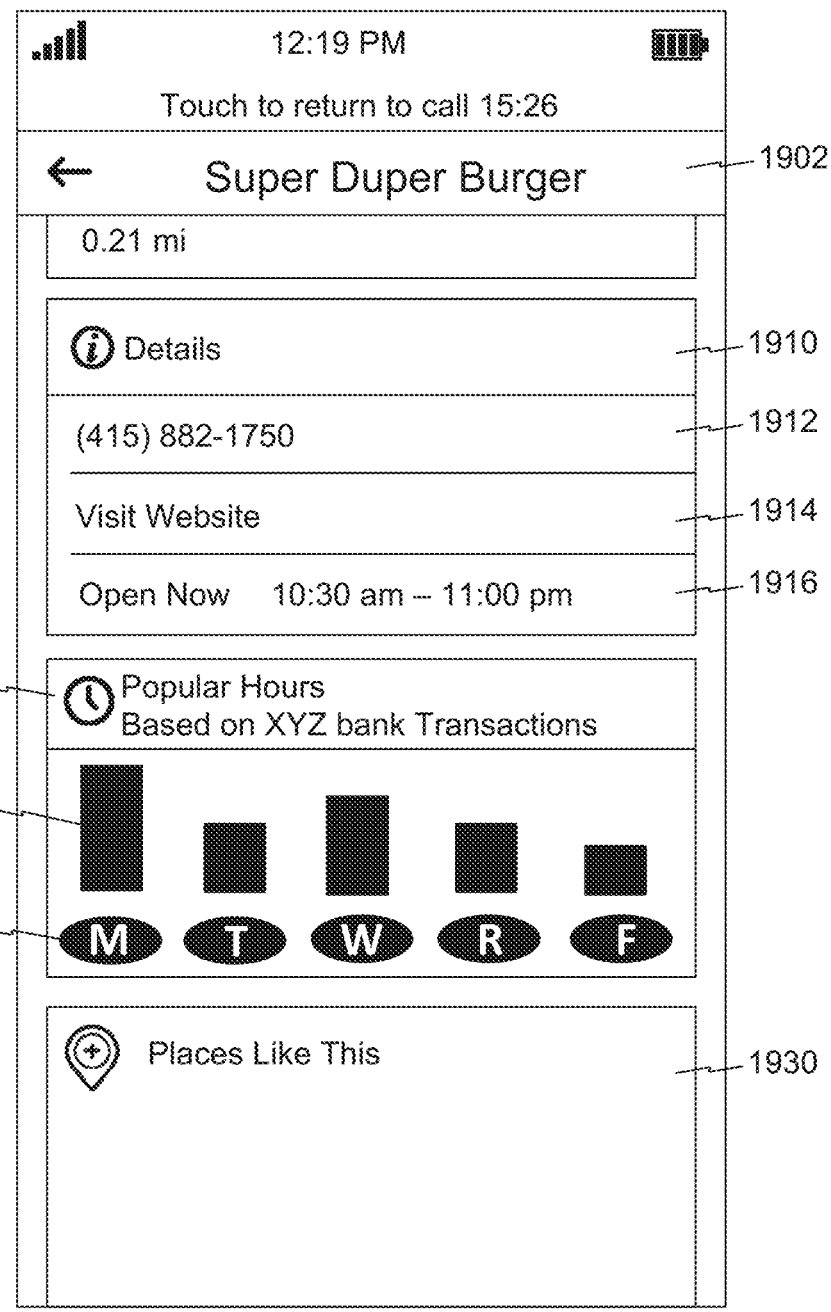
FIG. 19 is a first exemplary graphical user interface for displaying popular hours, according to disclosed embodiments.

FIG. 19 is a first exemplary graphical user interface for popular hours, according to disclosed embodiments. Graphical user interface 1900 may be generated by prediction system 110 and be transmitted for display in client devices 150. However, in other embodiments, prediction system 110 may only transmit information to client devices 150 which may be running software that interprets data and generates graphical user interfaces.

Graphical user interface 1900 may include top banner 1902, details window 1910, prediction window 1920, and recommendations window 1930.

Top banner 1902 may include information about a merchant. For example, top banner 1902 may include information like merchant ID 1802 and location ID 1804.

Details window 1910 may include links associated with the merchant. For example, details window 1910 may include a contact link 1912 and a website link 1914 associated with the merchant. Website link 1914 may include a hyperlink to a merchant website. Additionally, details window 1910 may include an hours of operation prediction 1916. The hours of operation prediction 1916 may be based on the information a prediction list generated by, for example, prediction system 110 in step 620 using methods described in connection to FIG. 6.

Prediction window 1920 may include a title that describes the source of credit card authorization data that is being used to generate a popular hours prediction. In some embodiments, prediction window 1920 may include a histogram with popular hours representing information of, for example, the smoothed array generated in step 1514. In other embodiments, prediction window 1920 may include popularity indicators 1922 and day of the week icons 1924. The popularity indicators 1922 may describe information how busy is a merchant in a day of the week. For example, based on credit card authorizations volume, popularity indicators 1922 may indicate how busy a merchant is on Monday compared to Tuesday. As it is shown in FIG. 19, popularity indicators may not have any unit and merely present a graphic representation of the merchant's occupancy every day. However, in other embodiments, popularity indicators 1922 may display a unit such as number of transactions, or number of transactions multiplied by the transactions amount. In some embodiments, day of the week icons 1924 may be buttons for user interaction. For example, in some embodiments, when a user of client devices 150 interacts with day of the week icons 1924 it may request the generation of a secondary user interface that has more information about popular hours for the specific day. For example, if a user selects the Monday icon "M" day of the week icon 1924, the user may be presented with a secondary graphical user interface such as graphical user interface 2000, which is described in connection to FIG. 20.

Recommendations window 1930 may include information of merchants similar to the merchant identified in top banner 1902. For example, if merchant ID 1802 identifies a coffee shop, recommendations window 1930 may display a merchant with a similar description. In some embodiments, the merchant displayed in recommendations window 1930 may have a lower occupancy than the merchant identified in top banner 1902. That is, when user inquiries about popular hours of a merchant, graphical user interface 1900 may additionally display other similar merchants that have a lower predicted occupancy. In this way, system 100 may direct users to merchants that have similar services but are expected to be less busy. In some embodiments, the recommendation may be based on the location of client devices 150. For example, if a merchant is requesting popular hours of a bank but a bank in a nearby location has a lower predicted occupancy, graphical user interface 1900 may display the location and expected occupancy of the nearby bank. For example, recommendations window 1930 may display a message such as "ANOTHER BRANCH OF CAPITAL ONE IS EXPECTED TO BE LESS BUSY AND IS LOCATED IN 125 MAIN ST." Additionally or alternatively, the recommendation displayed in recommendations window 1930 may be based on advertisements paid by merchant systems 160.

Figure 20:
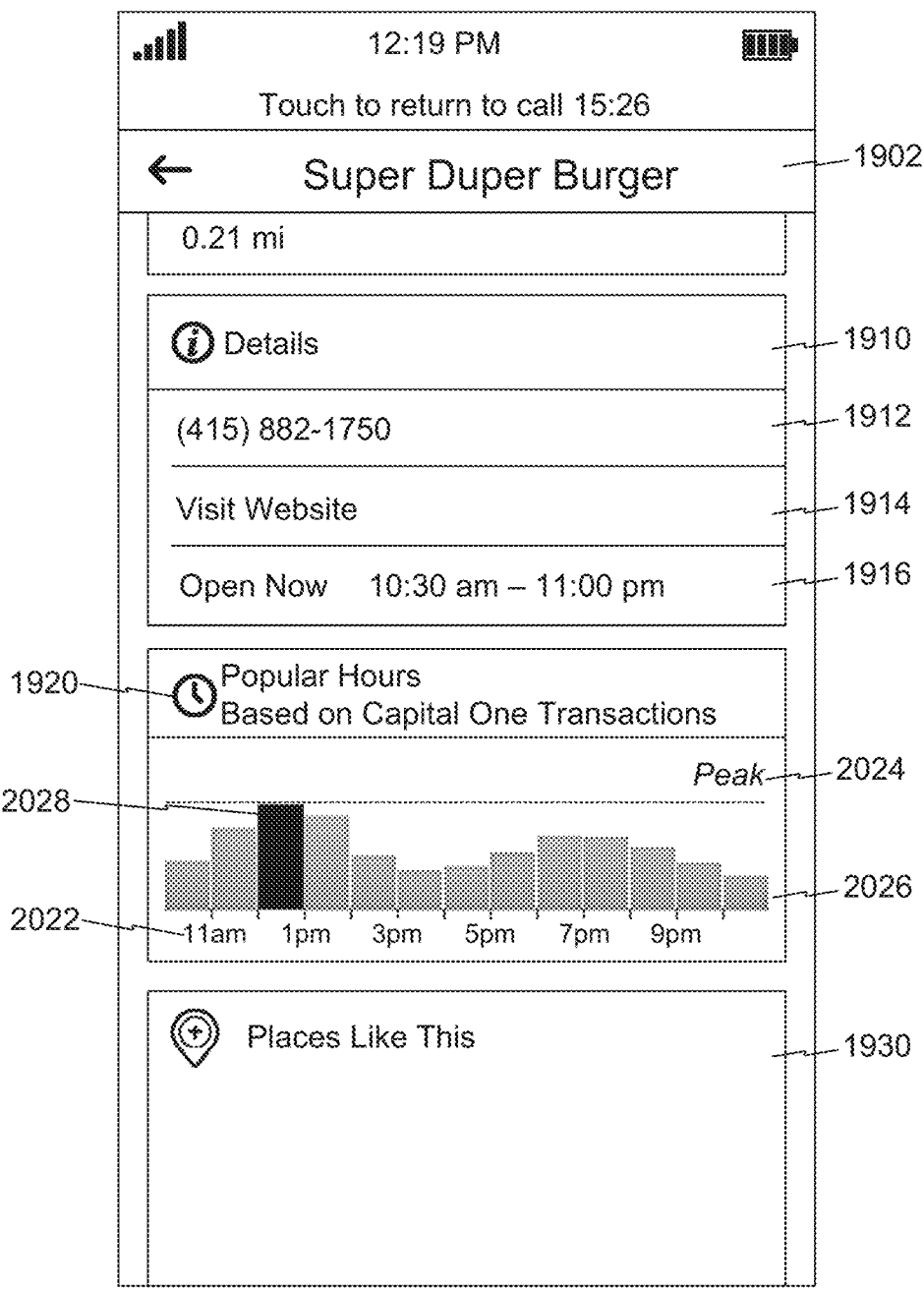
FIG. 20 is a second exemplary graphical user interface for displaying popular hours, according to disclosed embodiments.

FIG. 20 is a second exemplary graphical user interface for popular hours, according to disclosed embodiments. Graphical user interface 2000 may be accessed when a user interacts with day of the week icons 1924. Graphical user interface 2000 may have similar windows to graphical user interface 1900. For example, graphical user interface 2000 may also include Graphical user interface 1900 may include a top banner 1902, a details window 1910, a prediction window 1920, and a recommendations window 1930. However, the content of windows in graphical user interface 2000 may change.

For example, when a user selects one of the days in graphical user interface 1900 selecting day of the week icons 1924, graphical user interface 2000 may modify the content presented in prediction window 1920. Instead of showing icons that group the prediction for one day, graphical user interface 2000 may present histogram 2026 for the predicted popular hours. Histogram 2026 may present predicted occupancy of a merchant at different time intervals for one day of the week. For example, as shown in FIG. 20, histogram 2026 may include hourly time intervals 2022. However, other time intervals of half an hour or fifteen minutes may also be displayed. Histogram 2026 may also include a peak limit 2024. Peak limit 2024 may be the maximum value that is used for minmax linear transformations to normalize the number of credit card authorizations during data processing.

In some embodiments, histogram 2026 may also include one a highlighted prediction 2028. Highlighted prediction may be the maximum expected occupancy and may differ from other indications of expected occupancy using different colors, shapes, or textures.

In some embodiments, each occupancy indicator in histogram 2026 may be a button that the user can interact with. In such embodiments, the recommendation presented in recommendations window 1930 may be updated to recommend a similar merchant with a low predicted occupancy at the selected time. For example, a user searched for a burger restaurant and selects the time interval from 1 pm to 2 pm on Tuesday in histogram 2026. Graphical user interface 200 may update the information in recommendations window 1930 to show a different burger restaurant with a lower expected occupancy from 1 pm to 2 pm on Tuesday. Like in graphical user interface 1900 the merchant displayed in recommendations window 1930 may be close to the location of client devices 150 that send the query for popular hours.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed remote control system and related methods. Other embodiments will be apparent to those skilled in the art from consideration of the specification and practice of the disclosed remote control system and related methods. It is intended that the specification and examples be considered as exemplary only, with a true scope being indicated by the following claims and their equivalents

What is claimed is:

1. A system for generating a graphical user interface in a client device comprising:
   at least one processor in communication with the client device and a database; and
   a storage medium storing instructions that configure the at least one processor to execute operations comprising:
      receiving, from the client device, a request for occupancy information of a specified merchant;
      obtaining, from the database in response to the request, a plurality of credit card proximity transactions associated with the merchant, the proximity transactions comprising at least one of NFC, chip-read, or swiped transactions;
      generating a posted transaction array based on the credit card proximity transactions, the posted transaction array comprising a plurality of time intervals and numbers of transactions for the time intervals;
      removing outlier members of the posted transaction array by applying a threshold filter;
      generating a transaction frequency array based on the posted transaction array, the transaction frequency array comprising weekdays and aggregated transactions associated with the weekdays, wherein generating the transaction frequency array comprises modifying the posted transaction array by multiplying the numbers of transactions for the time intervals by transaction values of the credit card authorizations;
      modifying the transaction frequency array by applying a transformation to the aggregated transactions;
      generating a smoothed array by applying a kernel density estimate to the transaction frequency array; and
      generating a graphical user interface displaying information in the smoothed array.

2. The system of claim 1, wherein the transformation comprises a minmax normalization.

3. The system of claim 1, wherein generating the transaction frequency array comprises:
   determining an aggregation window comprising an initial date and a final date, the initial date being a predetermined number of days before a current day, and the final date being the current day; and
   eliminating, from the posted transaction array, transactions outside the aggregation window.

4. The system of claim 1, wherein generating the transaction frequency comprises modifying the time intervals of the posted transaction array by subtracting a processing time.

5. The system of claim 4, wherein the processing time is based on numbers of transactions for the time intervals.

6. The system of claim 1, wherein the kernel density estimate comprises at least one of a Gaussian kernel or an Epanechnikov kernel.

7. The system of claim 6, wherein the kernel density estimate is an Epanechnikov kernel with a bandwidth of 2.

8. The system of claim 1 wherein:
   the time intervals are associated with dates; and
   the threshold filter eliminates elements in the posted transaction array when an aggregated number of transactions for a date is below a minimum transaction number.

9. The system of claim 8, wherein removing outlier members comprises down-sampling the posted transaction array such that each weekday has the same number of dates in the posted transaction array.

10. The system of claim 1, wherein:
    the graphical user interface comprises a first graphical user interface displaying a weekday selection option; and
    the operations further comprise:
       receiving a day selection from the client device; and
       generating a second graphical user interface displaying a histogram corresponding to the day selection.

11. The system of claim 10, wherein the first graphical user interface displays a hyperlink to a merchant website.

12. The system of claim 10, wherein the second graphical user interface highlights a peak popular hour in the histogram by at least one of a different color or a different shape.

13. The system of claim 1, wherein generating the transaction frequency array comprises:
    determining predicted hours of operation based on the posted transaction array; and
    eliminating time intervals outside the predicted hours of operation from the posted transaction array.

14. The system of claim 13, wherein:
    the graphical user interface displays a histogram in a first window; and the graphical user interface displays the predicted hours of operation in a second window different from the first window.

15. The system of claim 13, wherein determining hours of operation comprises:
   determining a plurality of model results for time intervals in the posted transition array using a plurality of prediction models, the prediction models outputting corresponding model results; and
   determining prediction indications for the time intervals in the posted transaction array by tallying the model results.

16. The system of claim 15, wherein the prediction models comprise decision tree models configured for random forest analysis.

17. The system of claim 1, wherein generating the posted transaction array comprises applying at least linear regression model.

18. A non-transitory computer-readable medium storing instructions that, when executed by a processor, cause the processor to operate a system for generating a graphical user interface in a client device, the instructions comprising:
   receiving, from the client device, a request for occupancy information of a specified merchant;
   obtaining, from the database in response to the request, a plurality of credit card proximity transactions associated with the merchant, the proximity transactions comprising at least one of NFC, chip-read, or swiped transactions;
   generating a posted transaction array based on the credit card proximity transactions, the posted transaction array comprising a plurality of time intervals and numbers of transactions for the time intervals;
   removing outlier members of the posted transaction array by applying a threshold filter;
   generating a transaction frequency array based on the posted transaction array, the transaction frequency array comprising weekdays and aggregated transactions associated with the week days, wherein generating the transaction frequency array comprises modifying the posted transaction array by multiplying the numbers of transactions for the time intervals by transaction values of the credit card authorizations;
   modifying the transaction frequency array by applying a transformation to the aggregated transactions;
   generating a smoothed array by applying a kernel density estimate to the transaction frequency array; and
   generating a graphical user interface displaying information of the smoothed array.

19. A computer-implemented method for generating a graphical user interface in a client device, the method comprising:
   receiving, from the client device, a request for occupancy information of a specified merchant;
   obtaining, from the database in response to the request, a plurality of credit card proximity transactions associated with the merchant, the proximity transactions comprising at least one of NFC, chip-read, or swiped transactions;
   generating a posted transaction array based on the credit card proximity transactions, the posted transaction array comprising a plurality of time intervals and numbers of transactions for the time intervals;
   removing outlier members of the posted transaction array by applying a threshold filter;
   generating a transaction frequency array based on the posted transaction array, the transaction frequency array comprising weekdays and aggregated transactions associated with the weekdays, wherein generating the transaction frequency array comprises modifying the posted transaction array by multiplying the numbers of transactions for the time intervals by transaction values of the credit card authorizations;
   modifying the transaction frequency array by applying a transformation to the aggregated transactions;
   generating a smoothed array by applying a kernel density estimate to the transaction frequency array; and
   generating a graphical user interface displaying information of the smoothed array.

* * * * *